(12) United States Patent
Sambonsugi

(10) Patent No.: US 8,593,549 B2
(45) Date of Patent: Nov. 26, 2013

(54) IMAGE CAPTURE APPARATUS

(75) Inventor: Hideaki Sambonsugi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/432,609

(22) Filed: Mar. 28, 2012

(65) Prior Publication Data

US 2012/0268633 A1 Oct. 25, 2012

(30) Foreign Application Priority Data

Apr. 21, 2011 (JP) ................................ 2011-095277

(51) Int. Cl.
 *H04N 9/04* (2006.01)
(52) U.S. Cl.
 USPC ........... 348/281; 348/302; 348/311; 348/312; 348/319; 348/300
(58) Field of Classification Search
 None
 See application file for complete search history.

(56) References Cited

U.S. PATENT DOCUMENTS

| 7,800,787 B2* | 9/2010 | Shimizu ........................ 358/474 |
| 2006/0214087 A1* | 9/2006 | Komori et al. ............. 250/208.1 |
| 2009/0207295 A1* | 8/2009 | Funakoshi et al. ............ 348/311 |
| 2010/0045830 A1* | 2/2010 | Yuyama ........................ 348/249 |
| 2010/0079648 A1* | 4/2010 | Totsuka et al. ................ 348/308 |
| 2011/0075002 A1* | 3/2011 | Kato ............................. 348/311 |

FOREIGN PATENT DOCUMENTS

JP 08-111821 4/1996

* cited by examiner

*Primary Examiner* — Roberto Velez
*Assistant Examiner* — Padma Haliyur
(74) *Attorney, Agent, or Firm* — Cowan, Liebowitz & Latman, P.C.

(57) ABSTRACT

An image capture apparatus includes an image sensor, a determination unit which determines one image capturing mode, a driving unit which drives the image sensor by different driving methods in the respective image capturing modes, and a control unit which controls the operation of the driving unit. The image sensor includes a plurality of two-dimensionally arrayed pixels, a predetermined number of vertical output lines arranged for each array of pixels, and a holding memory which holds pixel signals from pixels on rows. The control unit drives the image sensor in the first power save mode when a horizontal transfer period is not less than twice a vertical transfer period, and drives the image sensor in the second power save mode when the vertical transfer period is not less than twice the horizontal transfer period.

10 Claims, 16 Drawing Sheets

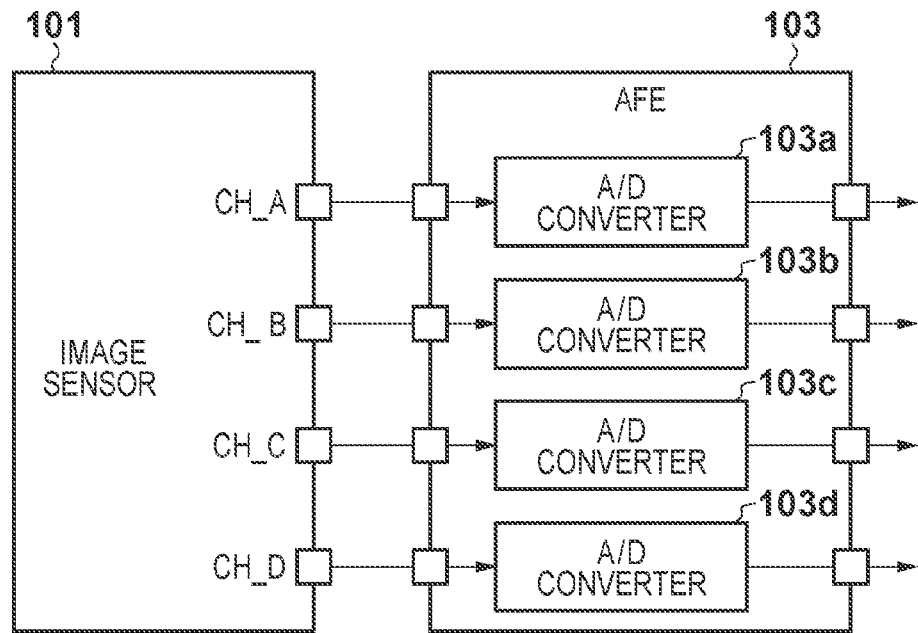
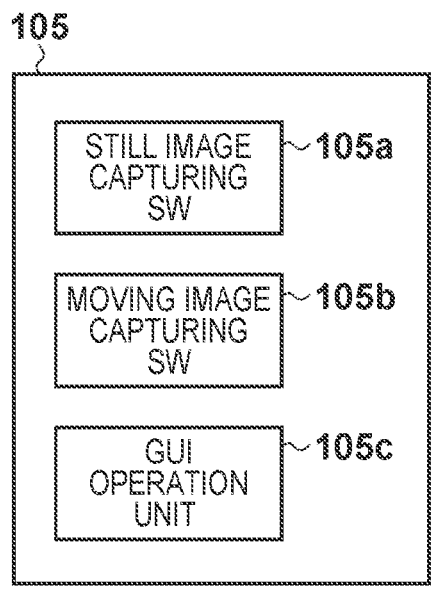
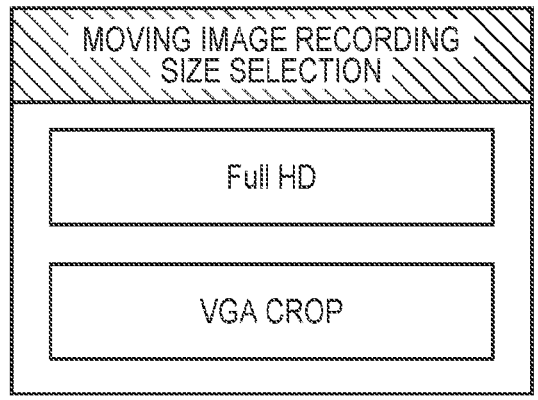

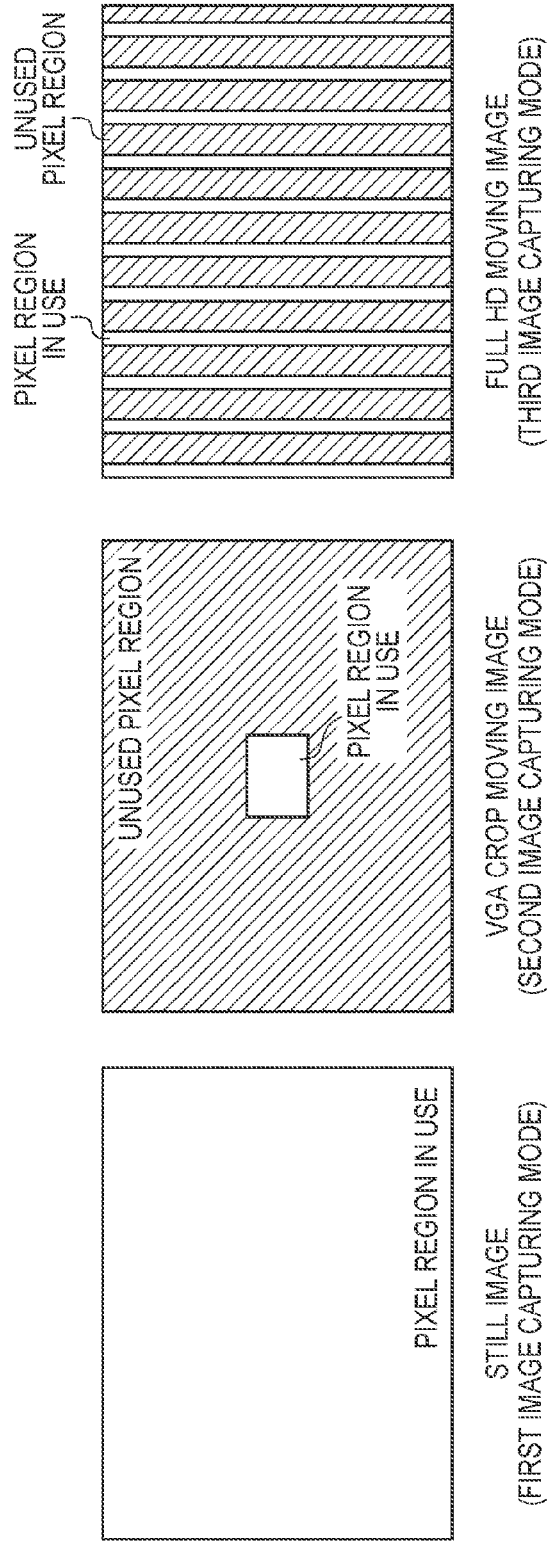

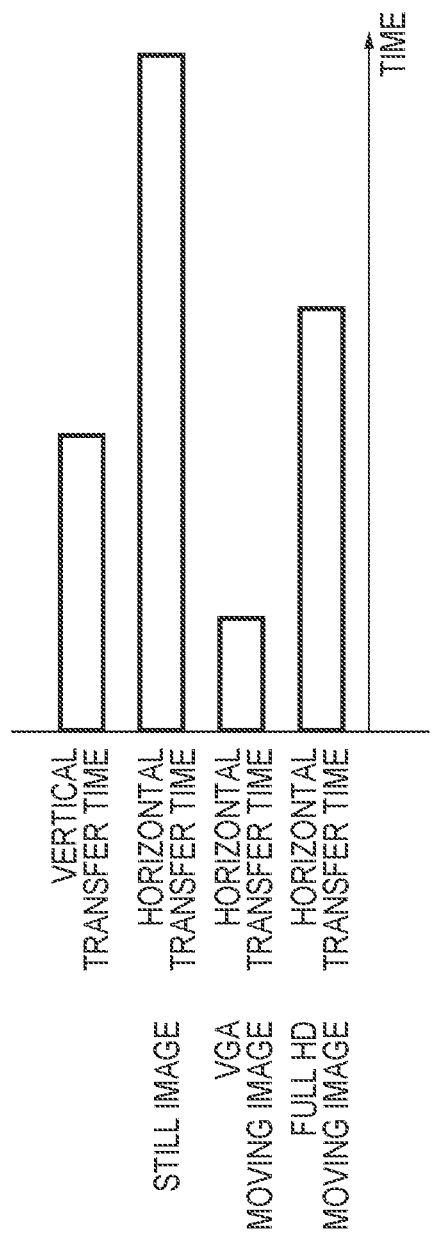

IMAGE CAPTURE APPARATUS

BACKGROUND OF THE INVENTION

1. Field of the Invention

The present invention relates to an image sensor including a plurality of pixels arranged in a matrix in the horizontal and vertical directions and an image capture apparatus and, more particularly, to an image sensor having a plurality of driving methods and an image capture apparatus.

2. Description of the Related Art

Recently, with an increase in the number of pixels of an image sensor, it is necessary to read out pixel signals at high speed to ensure a frame rate or the like.

For example, Japanese Patent Laid-Open No. 08-111821 has proposed a technique of increasing a frame rate by providing a plurality of vertical signal lines for one pixel column and simultaneously performing vertical/horizontal transfer for two rows.

According to the conventional technique disclosed in Japanese Patent Laid-Open No. 08-111821 described above, however, since the number of readout circuits increases, the power consumption is high even at the time of operation which does not require a high frame rate. In addition, the power supplies of readout circuits cannot be turned on and off at short time intervals due to the responsiveness of the power supplies.

SUMMARY OF THE INVENTION

The present invention has been made in consideration of the above problems, and suppresses an increase in power consumption while achieving an increase in the speed of reading out pixel signals.

An image capture apparatus according to the present invention, there is provided an image capture apparatus comprising: an image sensor which photoelectrically converts an object image; determination unit configured to determine one image capturing mode from a plurality of image capturing modes; driving unit configured to drive the image sensor by different driving methods in the respective image capturing modes determined by the determination unit; and control unit configured to control operation of the driving unit, wherein the image sensor includes a plurality of two-dimensionally arrayed pixels, a predetermined number of vertical output lines arranged for each array of pixels, of the plurality of pixels, which are arranged in a vertical direction, and a holding memory which holds pixel signals from pixels, of the plurality of pixels, which are on rows arranged in a horizontal direction, and the control unit drives the image sensor in a first power save mode when a horizontal transfer period in which pixel signals stored in the holding memory are sequentially output outside the image sensor is not less than twice a vertical transfer period in which pixel signals from pixels arranged in the horizontal direction are stored in the holding memory via the vertical output line, and drives the image sensor in a second power save mode when the vertical transfer period is not less than twice the horizontal transfer period.

Further features of the present invention will become apparent from the following description of exemplary embodiments with reference to the attached drawings.

BRIEF DESCRIPTION OF THE DRAWINGS

FIG. 2 is a block diagram showing the arrangement of an AFE;

FIG. 3 is a block diagram showing the arrangement of an operation unit;

FIG. 4 is a view showing a moving image recording size selection window;

FIG. 5 is a view showing pixel regions used in the respective image capturing modes;

FIG. 6 is a view showing the relationship between the vertical transfer time and the horizontal transfer time;

DESCRIPTION OF THE EMBODIMENTS

The embodiments of the present invention will be described in detail below with reference to the accompanying drawings.

First Embodiment

Figure 1:
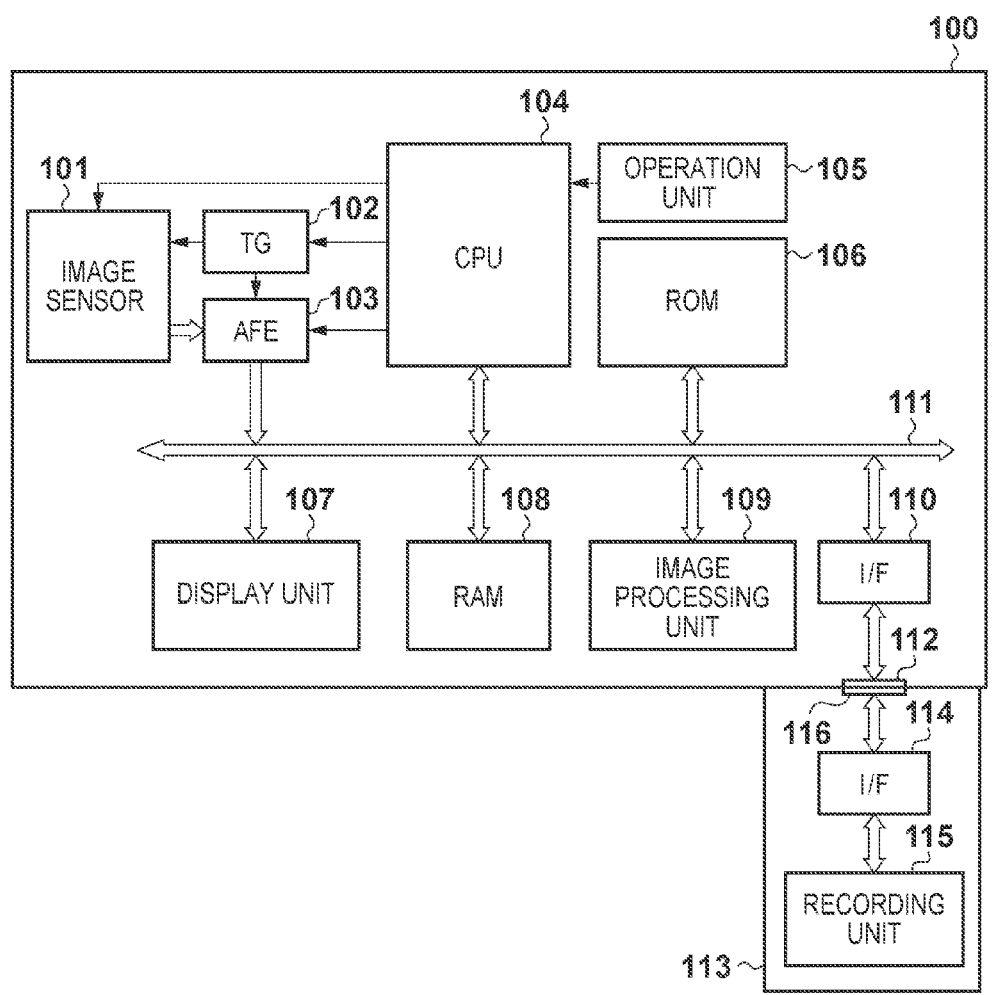
FIG. 1 is a block diagram showing the arrangement of an image capture apparatus according to the first and second embodiments of the present invention.

FIG. 1 is a block diagram showing the arrangement of an image capture apparatus common to the respective embodiments of the present invention. In an image capture apparatus 100 shown in FIG. 1, an image sensor 101 has pixels two-dimensionally arrayed, and photoelectrically converts an object image. An analog front end (to be referred to as an AFE hereinafter) 103 digitally converts the analog image signal output from the image sensor 101 in accordance with gain adjustment and a predetermined quantization bit. A timing generator (to be referred to as a TG hereinafter) 102 controls the driving timings for the image sensor 101 and the AFE 103. As shown in FIG. 2, the AFE 103 includes A/D converters 103a to 103d corresponding to the output channels of the image sensor 101. It is possible to independently ON/OFF-control the A/D converters 103a to 103d in accordance with settings from a CPU 104 (to be described later).

A RAM 108 has both the function of a image data storage unit for storing the image data digitally converted by the AFE 103 and the image data processed by an image processing unit 109 and the function of a work memory to be used at the time of the operation of the CPU 104 (to be described later). This embodiment uses these functions by the RAM 108. However, it is possible to use another type of memory as long as it can operate at a level sufficient in terms of access speed.

A ROM 106 stores programs to be used when the CPU 104 (to be described later) operates. This embodiment uses a Flash-ROM. However, this is merely an example, and it is possible to use another type of memory as long as it can operate at a level sufficient in terms of access speed.

The CPU 104 comprehensively controls the image capture apparatus 100. The image processing unit 109 performs processing such as correction and compression of captured images. A connector 112 is connected to a connector 116 of an external recording medium 113 such as a nonvolatile memory or hard disk. An interface unit 110 communicates with an interface 114 of the connected external recording medium 113 to record still image data and moving image data on the external recording medium 113. Although this embodiment uses a detachable external recording medium as a recording medium, it is possible to use another form incorporating a nonvolatile memory or hard disk which allows data to be written.

The user operates an operation unit 105 to make settings such as an image capturing command and image capturing conditions with respect to the CPU 104. As shown in FIG. 3, the operation unit 105 includes a still image capturing switch 105a, a moving image capturing switch 105b, and a GUI operation unit 105c for operating menus and the like displayed on a display unit. A display unit 107 displays captured still and moving images, menus, and the like.

The image capture apparatus 100 according to this embodiment has a plurality of image capturing modes. In the respective image capturing modes, the image sensor 101 operates while switching between driving methods.

FIG. 5 is a view showing the pixel region to be used in an effective pixel region in each mode. In the still image mode (first image capturing mode), the apparatus reads out signals from all the pixels in the effective pixel region. In the VGA crop moving image mode (second image capturing mode), the apparatus reads out signals from pixels in a small region located in the center of the effective pixel region. In the Full HD moving image mode (third image capturing mode), the apparatus reads out signals from pixels while thinning out pixel signals in the horizontal direction. The number of pixels in the horizontal direction differs in each image capturing mode due to the above differences between the readout schemes, and hence the time required for one-row horizontal transfer (to be described later) differs. FIG. 6 is a view showing the relationship between the vertical transfer time (to be described later) and the one-row horizontal transfer time in each mode. The horizontal transfer time is the longest in the still image mode, and becomes shorter in the Full HD moving image mode and the VGA crop moving image mode in the order named.

Figure 7:
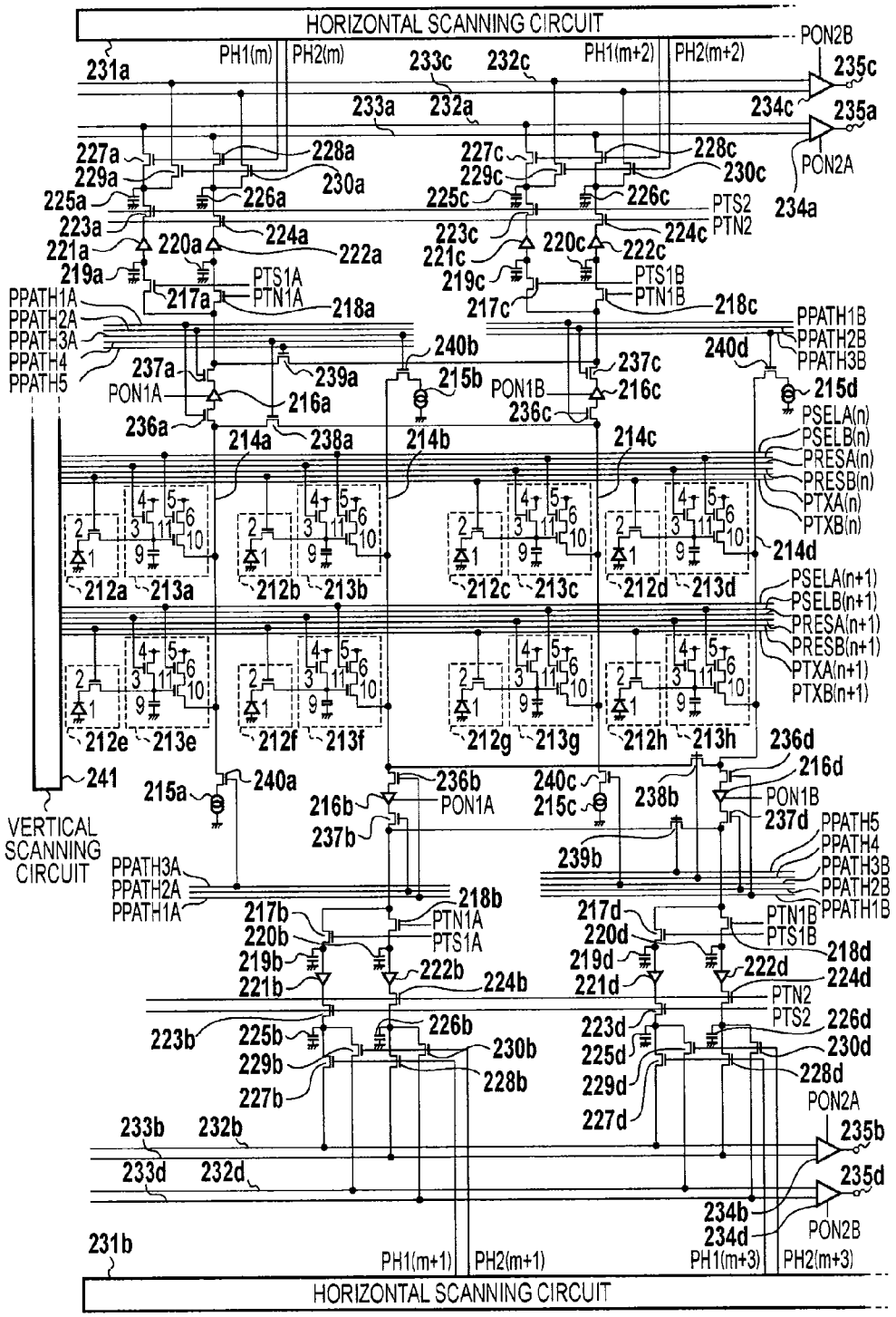
FIG. 7 is a circuit diagram showing the arrangement of an image sensor according to the first embodiment.

The arrangement of the image sensor 101 will be described with reference to FIG. 7. Referring to FIG. 7, the effective pixel region of the image sensor is formed by arraying a plurality of pixel sets (pixel rows), arranged in the vertical direction (column direction), in the horizontal direction (row direction). That is, pixel sets 212a and 212e, 212b and 212f, 212c and 212g, and 212d and 212h are arrayed. In the effective pixel region, signal transfer units 213a to 213h are provided, each including a reset switch 3, a pixel amplifier 10, and a row selection switch 6. The signal transfer units 213a to 213h are respectively connected to the pixel sets 212a to 212h.

The gates of transfer switches 2 of the pixel sets 212a and 212b are connected to a signal line to which a control signal PTXA(n) is output from a vertical scanning circuit 241. The gates of the transfer switches 2 of the pixel sets 212c and 212d are connected to a signal line to which a control signal PTXB (n) is output. Likewise, the gates of the transfer switches 2 of the pixel sets 212e and 212f are connected to a signal line to which a control signal PTXA(n+1) is output. The gates of the transfer switches 2 of the pixel sets 212g and 212h are connected to a signal line to which a control signal PTXB(n+1) is output. Each pixel set includes the photodiodes 1 and the transfer switch 2.

The gates of the reset switches 3 of the signal transfer units 213a and 213b are connected to a signal line to which a control signal PRESA(n) is output from the vertical scanning circuit 241. The gates of the row selection switches 6 are connected to a signal line to which a control signal PSELA(n) is output from the vertical scanning circuit 241. The gates of the reset switches 3 of the signal transfer units 213c and 213d are connected to a signal line to which a control signal PRESB (n) is output from the vertical scanning circuit 241. The gates of the row selection switches 6 are connected to a signal line to which a control signal PSELB(n) is output from the vertical scanning circuit 241. Likewise, the gates of the reset switches 3 of the signal transfer units 213e and 213f are connected to a signal line to which a control signal PRESA(n+1) is output. The gates of the row selection switches 6 are connected to a signal line to which a control signal PSELA(n+1) is output. The gates of the reset switches 3 of the signal transfer units 213g and 213h are connected to a signal line to which a control signal PRESB(n+1) is output. The gates of the row selection switches 6 are connected to a signal line to which a control signal PSELB(n+1) is connected.

The signal transfer units 213a and 213e are connected to the vertical output line 214a adjacent to a pixel array longitudinally extending in the image sensor. Likewise, the signal transfer units 213b and 213f, 213c and 213g, and 213d and 213h are respectively connected to vertical output lines 214b, 214c, and 214d.

Vertical output lines 214a to 214d are respectively connected to constant current sources 215a to 215d via switches 240a to 240d, and are connected to column amplifiers (amplifiers) 216a to 216d via switches 236a to 236d. Note that the column amplifiers 216a to 216d are alternately arranged above and below the effective pixel region. The column amplifiers 216a to 216d are respectively connected to holding capacitors (holding memories) 219a to 219d and 220a to 220d via switches 237a to 237d and transfer gates 217a to 217d and 218a to 218d. Note that a control signal PON1A output from the TG 102 ON/OFF-controls the column amplifier 216a and 216b. A control signal PON1B from the TG 102 ON/OFF-controls the column amplifiers 216c and 216d.

The vertical output lines 214a and 214c are connected to each other via a switch 238a. The vertical output lines 214b and 214d are connected to each other via a switch 238b. The outputs of the column amplifiers 216a and 216c are connected to each other via a switch 239a. The outputs of the column amplifiers 216b and 216d are connected to each other via a switch 239b. The following control signals ON/OFF-control these switches in the following manner.

A control signal PPATH1A output from the TG 102 controls the switches 236a and 236b. A control signal PPATH1B controls the switches 236c and 236d. A control signal PPATH2A output from the TG 102 controls the switches 237a and 237b. A control signal PPATH2B controls the switches 237c and 237d.

A control signal PPATH3A output from the TG 102 controls the switches 240a and 240b. A control signal PPATH3B controls the switches 240c and 240d. A control signal PPATH4 output from the TG 102 controls the switches 238a and 238b. A control signal PPATH5 controls the switches 239a and 239b.

The holding capacitors 219a to 219d are connected to holding capacitors 225a to 225d via buffers 221a to 221d and transfer gates 223a to 223d. Likewise, the holding capacitors 220a to 220d are connected to holding capacitors 226a to 226d via buffers 222a to 222d and transfer gates 224a to 224d. The holding capacitors 225a and 226a are connected to horizontal output lines 232a and 233a or horizontal output lines 232c and 233c via output transfer switches 227a, 228a, 229a, and 230a which are driven by a control signal PH1(m) or PH2(m) from a horizontal scanning circuit 231a. Likewise, the holding capacitors 225b and 226b are connected to the horizontal output lines 232b and 233b or the horizontal output lines 232d and 233d via output transfer switches 227b, 228b, 229b, and 230b driven by a control signal PH1 (m+1) or PH2 (m+1). The holding capacitors 225c and 226c are connected to the horizontal output lines 232a and 233a or the horizontal output lines 232c and 233c via output transfer switches 227c, 228c, 229c, and 230c driven by a control signal PH1(m+2) or PH2(m+2). The holding capacitors 225d and 226d are connected to the horizontal output lines 232b and 233b or the horizontal output lines 232d and 233d via output transfer switches 227d, 228d, 229d, and 230d driven by a control signal PH1 (m+3) or PH2(m+3).

Readout amplifiers 234a to 234d are connected to the horizontal output lines 232a to 232d and 233a to 233d, and output the signals obtained by multiplying the difference outputs obtained by combinations of the horizontal output lines 232a and 233a and the like by predetermined gains. A control signal PON2A output from the TG 102 ON/OFF-controls the readout amplifiers 234a and 234b. A control signal PON2B output from the TG 102 ON/OFF-controls the readout amplifiers 234c and 234d. Outputs from these readout amplifiers are output from output terminals 235a to 235d of the image sensor.

The operation of the image sensor in each mode will be described next. First of all, when the user presses the still image capturing switch 105a shown in FIG. 3, the CPU 104 makes settings for still image capturing (the first image capturing mode) with respect to the image sensor 101 and the TG 102. Thereafter, the CPU 104 outputs an image capturing start signal to the TG 102, and the image sensor 101 starts image capturing operation based on a driving signal from the TG 102.

Figure 9:
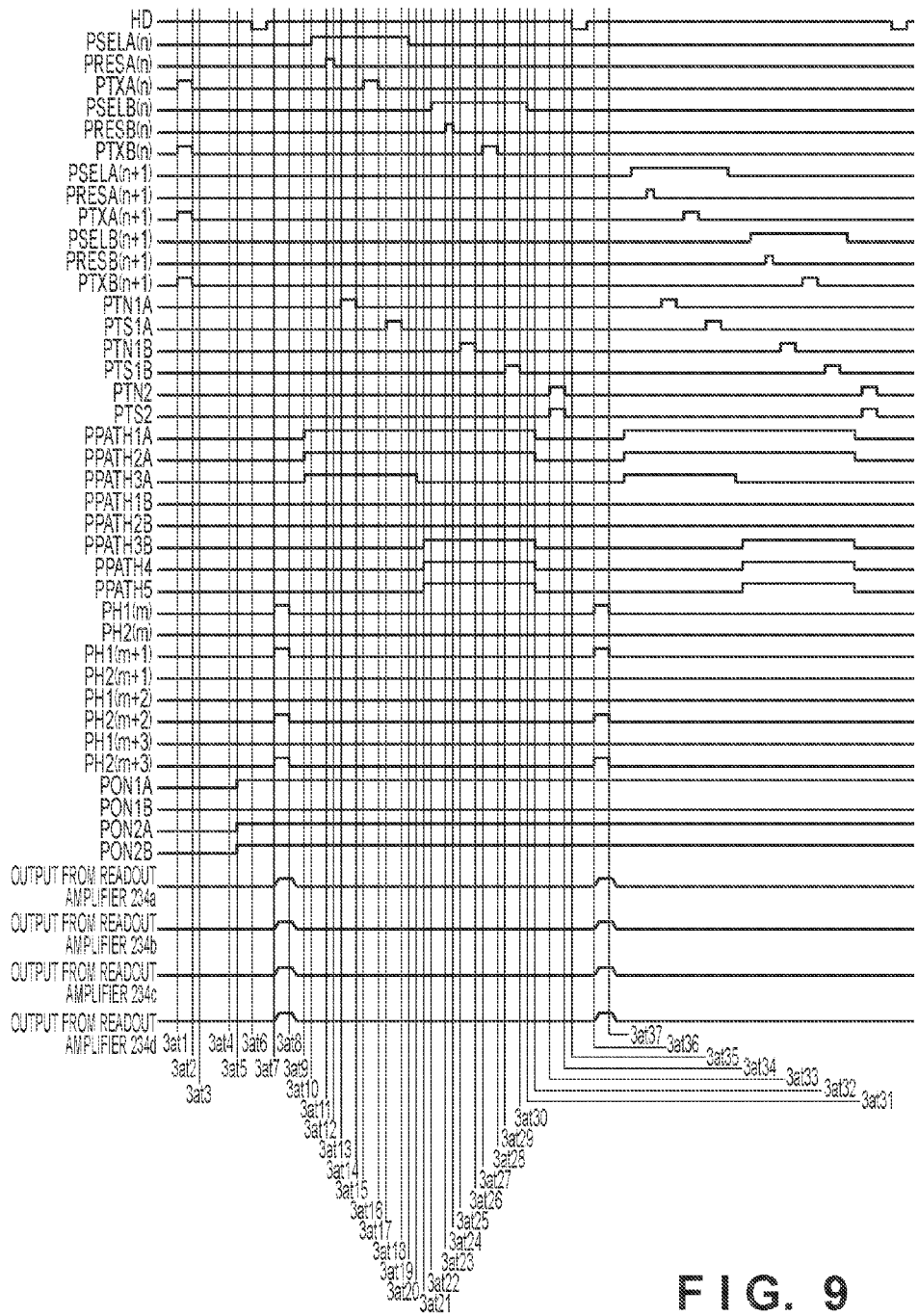
FIG. 9 is a view showing the operation of the image sensor according to the first embodiment.

FIG. 9 is a view showing the operation timing of the image sensor 101 in the first image capturing mode (first power save mode). The operation of each unit will be described with reference to FIG. 9. In the time interval between times 3at1 and 3at2 corresponding to an all-pixel reset period, control signals PTXA(n), PTXA(n+1), PTXB(n), and PTXB(n+1) are activated. This case shows only control signals for specific rows. In this period, however, control signals PTX for all the rows are activated, and the charges in photodiodes 1 of all the pixel sets are transferred to gates 11 of the pixel amplifiers 10 via transfer switches 2. The photodiodes 1 are then reset.

Thereafter, at time 3at3, all the pixels simultaneously start accumulating charges. At time 3at4, a mechanism (not shown) outside the image sensor shields against light applied to the image sensor. The time interval between times 3at3 and 3at4 corresponds to an accumulation period. In this state, signal charges are accumulated in the photodiodes 1. In this case, all the pixels simultaneously start accumulating charges. However, the present invention is not limited to this arrangement. An arrangement for resetting the photodiodes 1 can be arbitrarily designed. For example, different reset timings may be set for the respective TOWs.

At time 3at5, the control signals PON1A, PON2A, and PON2B are activated to turn on the column amplifiers 216a and 216b and the readout amplifiers 234a to 234d.

The operation of reading out accumulated signal charges then starts, and a timing signal HD indicating the unit of one-row readout operation is asserted at time 3at6. When readout operation starts, the control signals PH1(m), PH1(m+1), PH2(m+2), and PH2(m+4) are activated in the time interval between times 3at7 and 3at8, and pixel signals on the (n−1)th row which are stored in the holding capacitors 225a to 225d and 226a to 226d are output from the readout amplifiers 234a to 234d with the operation to be described later. The pixel signals are then output from the output terminals 235a to 235d. Although a specific case is described, signals are sequentially output from all the columns in the same manner. Output operations corresponding to all the columns are independently performed until the timing signal HD is asserted next, and do not depend on the vertical transfer timing (to be described later) or the like.

The apparatus performs vertical transfer of pixel sets 212a and 212b arranged on the nth row. At time 3at9, the control signals PPATH1A and PPATH2A are activated to activate paths for the vertical transfer of signals from the pixel sets 212a and 212b. In addition, the control signal PPATH3A is activated to connect the vertical output lines 214a and 214b to the current sources 215a and 215b. At time 3at10, the control signal PSELA(n) is activated to turn on the row selection switches 6. The source follower circuits respectively constituted by the pixel amplifiers 10 of the signal transfer units 213a and 213b and the current sources 215a and 215b connected to the respective vertical output lines are set in the operating state.

At time 3at11, a control signal PRESA(n) is activated to turn on the reset switches 3, thereby initializing the gates 11 of the pixel amplifiers 10 of the signal transfer units 213a and 213b, that is, capacitors 9. That is, signals of the signal level immediately after this resetting operation (so-called dark level) are output to the vertical output lines 214a and 214b.

At time 3at12, the control signal PRESA(n) is negated. Thereafter, at time 3at13, the control signal PTN1A is activated. This turns on the transfer gates 218a and 218b connected to the outputs of the column amplifiers 216a and 216b connected to the vertical output lines 214a and 214b, thereby holding the dark level output in each of the holding capacitors 220a and 220b. Thereafter, the transfer operation is complete at time 3at14, and the control signal PTXA(n) is activated at time 3at15 to turn on the transfer switches 2 of the pixel sets 212a and 212b. The signal charges accumulated in the photodiodes 1 are then transferred to the gates 11 of the source followers formed by the pixel amplifiers 10 of the signal transfer units 213a and 213b. At this time, the signal level of each source follower formed by the pixel amplifier 10 changes from the reset level by an amount corresponding to the signal charge transferred to the source follower. As a consequence, the signal level is settled.

At time 3at16 when the transfer operation is sufficiently complete, the control signal PTXA(n) is negated. At time 3at17, the control signal PTS1A is activated. This turns on the transfer gates 217a and 217b connected to the outputs of the column amplifiers 216a and 216b connected to the vertical output lines 214a and 214b, thereby holding the signal level in the holding capacitors 219a and 219b. When the control signal PTS1A is negated thereafter at time 3at18, the transfer operation is complete.

With the above operation, the holding capacitors 219a and 219b hold the signal level of the pixel sets 212a and 212b, and the holding capacitors 220a and 220b hold the dark level of the pixel sets 212a and 212b.

Since the output of signals from the pixels is complete, the selection control signal PSELA(n) is negated at time 3at19. At time 3at20, the control signal PPATH3A is negated to disconnect the vertical output lines 214a and 214b from the current sources 215a and 215b.

The apparatus then performs vertical transfer of the pixel sets 212c and 212d arranged on the nth row. At time 3at21, the control signal PPATH3B is activated to connect the vertical output lines 214c and 214d to the current sources 215c and 215d. In addition, the control signals PPATH4 and PPATH5 are activated to activate paths for the vertical transfer of signals from the pixel sets 212c and 212d. Subsequently, at time 3at22, the control signal PSELB(n) is activated to turn on the row selection switches 6. The source follower circuits respectively constituted by the pixel amplifiers 10 of the signal transfer units 213c and 213d and the current sources 215c and 215d connected to the respective vertical output lines are set in the operating state.

At time 3at23, the control signal PRESB(n) is activated to turn on the reset switches 3 to initialize the gates 11 of the pixel amplifiers 10 of the signal transfer units 213c and 213d, that is, the capacitors 9. That is, signals of the signal level immediately after this resetting operation (so-called dark level) are output to the vertical output lines 214c and 214d.

After the control signal PRESB(n) is negated at time 3at24, the control signal PTN1B is activated at time 3at25. This turns on the transfer gates 218c and 218d connected to the outputs of the column amplifiers 216a and 216b connected to the vertical output lines 214c and 214d, thereby holding the dark level output in each of the holding capacitors 220c and 220d. Thereafter, the transfer operation is complete at time 3at26, and the control signal PTXB(n) is activated at time 3at27 to turn on the transfer switches 2 of the pixel sets 212c and 212d. The signal charges accumulated in the photodiodes 1 are then transferred to the gates 11 of the source followers formed by the pixel amplifiers 10 of the signal transfer units 213c and 213d. At this time, the signal level of each source follower formed by the pixel amplifier 10 changes from the reset level by an amount corresponding to the signal charge transferred to the source follower. As a consequence, the signal level is settled.

At time 3at28 when the transfer operation is sufficiently complete, the control signal PTXB(n) is negated. At time 3at29, the control signal PTS1B is activated. This turns on the transfer gates 217c and 217d connected to the outputs of the column amplifiers 216a and 216b connected to the vertical output lines 214c and 214d, thereby holding the signal level in the holding capacitors 219c and 219d. When the control signal PTS1B is negated thereafter at time 3at30, the transfer operation is complete.

With the above operation, the holding capacitors 219c and 219d hold the signal level of the pixel sets 212c and 212d, and the holding capacitors 220c and 220d hold the dark level of the pixel sets 212c and 212d.

Since the output of signals from the pixels is complete, the selection control signal PSELB(n) is negated at time 3at31. At time 3at32, the control signals PPATH1A, PPATH2A, PPATH3B, PPATH4, and PPATH5 are negated. With the above operation, the vertical transfer of all the pixel sets on the nth row is complete.

At time 3at33, the control signals PTS2 and PTN2 are activated to turn on the transfer gates 223a to 223d and 224a to 224d connected to the outputs of the buffers 221a to 221d and 222a to 222d connected to the holding capacitors 219a to 219d and 220a to 220d. This transfers the charges held in the holding capacitors 219a to 219d and 220a to 220d to the holding capacitors 225a to 225d and 226a to 226d. When the control signals PTS2 and PTN2 are negated at time 3at34, the transfer operation is complete. Note that at time 3at33, all the signals on the (n−1)th row which are held in the holding capacitors 225a to 225d and 226a to 226d are output from the output terminals 235a to 235d.

With the above operation, one-row operation is complete. At time 3at35, the timing signal HD is asserted. The process then shifts to the next operation.

In the time interval between times 3at36 and 3at37, the horizontal scanning circuits 231a and 231b perform the operation of connecting the holding capacitors 225a to 225d and 226a to 226d to horizontal output lines (horizontal transfer lines) by controlling the transfer switches 227a to 227d, 228a to 228d, 229a to 229d, and 230a to 230d. When the control signal PH1(m) is activated, the holding capacitors 225a and 226a are respectively connected to the horizontal output lines 232a and 233a via the transfer switches 227a and 228a. That is, the dark level and signal level of the pixel set 212a have been input to the input of the readout amplifier 234a at this time, and the readout amplifier 234a outputs the signal obtained by multiplying the difference by a predetermined gain. Likewise, when the control signal PH1(m+1) is activated, the holding capacitors 225b and 226b are respectively connected to the horizontal output lines 232b and 233b via the transfer switches 227b and 228b. The readout amplifier 234b then outputs the signal obtained by multiplying the difference between the dark level and signal level of the pixel set 212b by a predetermined gain.

When the control signal PH2(m+2) is activated, the holding capacitors 225c and 226c are respectively connected to the horizontal output lines 232c and 233c via the transfer switches 227c and 228c. That is, the dark level and signal level of the pixel set 212c have been input to the input of the readout amplifier 234c at this time, and the readout amplifier 234c outputs the signal obtained by multiplying the difference by a predetermined gain. Likewise, when the control signal PH2(m+3) is activated, the holding capacitors 225d and 226d are respectively connected to the horizontal output lines 232d and 233d via the transfer switches 227d and 228d. The readout amplifier 234d then outputs the signal obtained by multiplying the difference between the dark level and signal level of the pixel set 212d by a predetermined gain.

From time 3at37, the apparatus performs the same operation as that in the time interval between times 3at9 and 3at34 with respect to the (n+1)th row, and transfers the signals in the pixel sets 212e to 212h to the holding capacitors 225a to 225d and 226a to 226d, respectively. Thereafter, at the time of operation in the unit of readout for the (n+2)th row, the output terminals 235a to 235d output signals in the pixel sets 212e to 212h.

Performing the above readout operation with respect to all the rows of the image sensor 101 will output signals from all the pixels arrayed on the image sensor 101. The AFE 103 digitally converts the signals output from the image sensor 101. The resultant signals are input to the image processing unit 109. After the image processing unit 109 performs predetermined processing for the signals, the resultant data is recorded as a still image on the external recording medium 113.

Figure 12A:
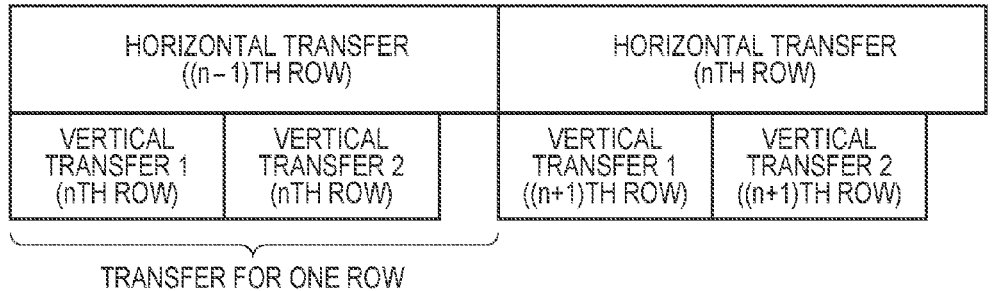
FIGS. 12A to 12C are views showing the operation of the image sensor according to the first embodiment.

FIG. 12A shows the relationship between the horizontal transfer time and the vertical transfer time in operation in the first image capturing mode described above. In the horizontal transfer time, the apparatus performs vertical transfer twice.

In other words, a horizontal transfer period is twice or more longer than a vertical transfer period. Performing vertical transfer twice separately in this manner allows to use only half of a plurality of column amplifiers. This makes it possible to stop the supply of power to the other half of the column amplifiers. This can reduce the power consumption at the time of readout operation. In addition, since the readout time for one row is determined by the horizontal transfer time, performing vertical transfer twice separately will not influence the readout speed.

Figure 10:
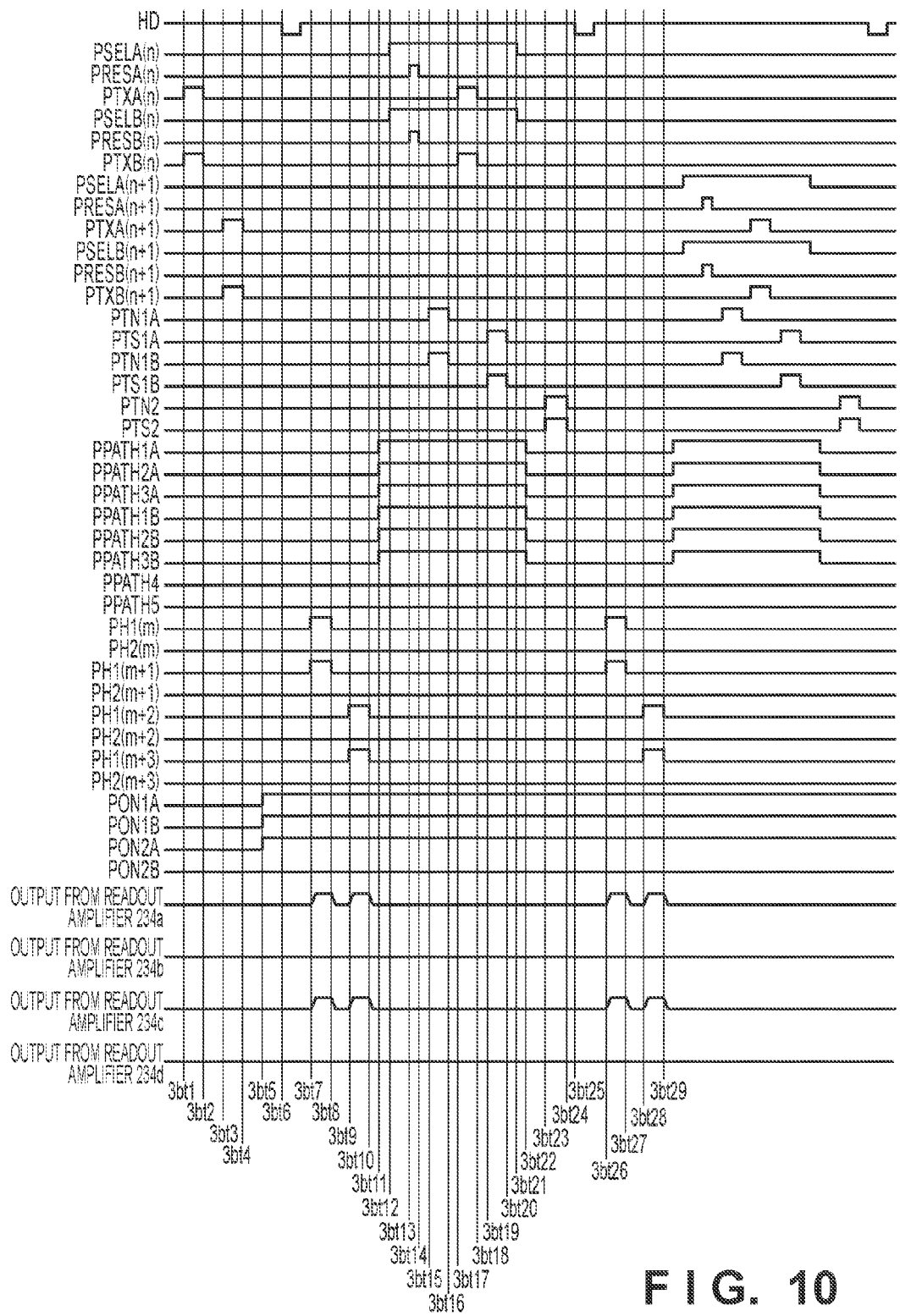
FIG. 10 is a view showing the operation of the image sensor according to the first embodiment.

Operation in the second image capturing mode (second power save mode) will be described next. First of all, the user operates the GUI operation unit 105 to display a moving image recording size selection window on the display unit 107, as shown in FIG. 4. When the user selects the VGA crop moving image mode (second image capturing mode) with the operation unit 105 and presses the moving image capturing switch 105b, the CPU 104 makes settings for the second image capturing mode with respect to the image sensor 101 and the TG 102. Thereafter, the CPU 104 outputs an image capturing start signal to the TG 102. The image sensor 101 starts image capturing operation based on a driving signal from the TG 102. FIG. 10 shows the operation timing of the image sensor 101 in the second image capturing mode. The operation of each unit will be described with reference to FIG. 10.

In the second image capturing mode, the apparatus executes slit rolling shutter operation, that is, vertical scanning twice in one image capturing operation. In the first vertical scan, the apparatus resets each pixel to start charge accumulation. In the second vertical scan, the apparatus finishes the charge accumulation and outputs signals. The time interval between times 3bt1 and 3bt2 corresponds to a reset period for the pixels arranged on the nth row. In this period, the control signals PTXA(n) and PTXB(n) are activated. The time interval from this pixel reset operation to the vertical transfer of pixel signals corresponds to an accumulation time. The vertical transfer timings for pixel signals on the (n+1)th row sequentially shift backward from those on the nth row. For this reason, the control signals PTXA(n+1) and PTXB (n+1) are activated to perform resetting operation between times 3bt3 and 3bt4 so as to make the accumulation time equal to that on the nth row. When the control signal PTX is activated, the charge in the photodiode 1 is transferred to the gate 11 of the pixel amplifier 10 via the transfer switch 2, and the photodiode 1 is reset.

At time 3bt5, the control signals PON1A, PON1B, and PON2A are activated to turn on the column amplifiers 216a to 216d and the readout amplifiers 234a and 234b.

The operation of reading out accumulated signal charges then starts. At time 3bt6, the timing signal HD indicating the unit of one-row readout operation is asserted. When the readout operation starts, the control signals PH1(m) and PH1(m+1) are activated between times 3bt7 and 3bt8. With the operation to be described later, the readout amplifiers 234a and 234b output pixel signals on the (n−1)th row stored in the holding capacitors 225a and 225b and 226a and 226b. Thereafter, the signals are output from the output terminals 235a and 235b.

The control signals PH1(m+2) and PH1(m+3) are activated between times 3bt9 and 3bt10. With the operation to be described later, the readout amplifiers 234a and 234b output pixel signals on the (n−1)th row stored in the holding capacitors 225c and 225d and 226c and 226d. Thereafter, the signals are output from the output terminals 235a and 235b. Although a specific case is described, signals are sequentially output from all the columns in the same manner. Output operations corresponding to all the columns are independently performed until the timing signal HD is asserted next, and do not depend on the vertical transfer timing (to be described later) or the like.

The apparatus performs vertical transfer of the pixel sets 212a and 212b arranged on the nth row. At time 3bt11, the control signals PPATH1A, PPATH2A, PPATH1B, and PPATH2B are activated to activate paths for the vertical transfer of signals from the pixel sets 212a to 212d via the column amplifiers 216a to 216d. At the same time, the control signal PPATH3A is activated to connect the vertical output lines 214a and 214b to the current sources 215a and 215b. In addition, the control signal PPATH3B is activated to connect the vertical output lines 214c and 214d to the current sources 215c and 215d. Subsequently, at time 3bt12, the control signals PSELA(n) and PSELB(n) are activated to turn on the row selection switches 6. The source follower circuits respectively constituted by the pixel amplifiers 10 of the signal transfer units 213a to 213d and the current sources 215a to 215d connected to the respective vertical output lines are set in the operating state.

At time 3bt13, the control signals PRESA(n) and PRESB (n) are activated to turn on the reset switches 3, thereby initializing the gates 11 of the pixel amplifiers 10 of the signal transfer units 213a to 213d, that is, capacitors 9. That is, signals of the signal level immediately after this resetting operation (so-called dark level) are output to the vertical output lines 214a to 214d.

At time 3bt14, the control signal PRESA(n) is negated. Thereafter, at time 3bt15, the control signals PTN1A and PTN1B are activated. This turns on the transfer gates 218a to 218d connected to the outputs of the column amplifiers 216a to 216d connected to the vertical output lines 214a to 214d, thereby holding the dark level output in each of the holding capacitors 220a to 220d. Thereafter, the transfer operation is complete at time 3bt16, and the control signals PTXA(n) and PTXB(n) are activated at time 3bt17 to turn on the transfer switches 2 of the pixel sets 212a to 212d. The signal charges accumulated in the photodiodes 1 are then transferred to the gates 11 of the source followers formed by the pixel amplifiers 10 of the signal transfer units 213a to 213d. At this time, the signal level of each source follower formed by the pixel amplifier 10 changes from the reset level by an amount corresponding to the signal charge transferred to the source follower. As a consequence, the signal level is settled.

At time 3bt18 when the transfer operation is sufficiently complete, the control signals PTXA(n) and PTXB(n) are negated. At time 3bt19, the control signals PTS1A and PTS1B are activated. This turns on the transfer gates 217a to 217d connected to the outputs of the column amplifiers 216a to 216d connected to the vertical output lines 214a to 214d, thereby holding the signal level in the holding capacitors 219a to 219d. When the control signals PTS1A and PTS1B are negated thereafter at time 3bt20, the transfer operation is complete.

With the above operation, the holding capacitors 219a to 219d hold the signal level of the pixel sets 212a to 212d, and the holding capacitors 220a to 220d hold the dark level of the pixel sets 212a to 212d.

Since the output of signals from the pixels is complete, the selection control signals PSELA(n) and PSELB(n) are negated at time 3bt21. At time 3bt22, the control signals PPATH1A, PPATH2A, PPATH3A, PPATH1B, PPATH2B, and PPATH3B are negated. With the above operation, the vertical transfer of all the pixel sets on the nth row is complete.

At time 3bt23, the control signals PTS2 and PTN2 are activated to turn on the transfer gates 223a to 223d and 224a to 224*d* connected to the outputs of the buffers 221*a* to 221*d* and 222*a* to 222*d* connected to the holding capacitors 219*a* to 219*d* and 220*a* to 220*d*. This transfers the charges held in the holding capacitors 219*a* to 219*d* and 220*a* to 220*d* to the holding capacitors 225*a* to 225*d* and 226*a* to 226*d*. When the control signals PTS2 and PTN2 are negated at time 3*bt*24, the transfer operation is complete. Note that at time 3*bt*23, all the signals on the (n−1)th row which are held in the holding capacitors 225*a* to 225*d* and 226*a* to 226*d* are output from the output terminals 235*a* to 235*d*.

With the above operation, one-row operation is complete. At time 3*bt*25, the timing signal HD is asserted. The process then shifts to the next operation.

In the time interval between times 3*at*26 and 3*at*27, the horizontal scanning circuits 231*a* and 231*b* perform the operation of connecting the holding capacitors 225*a* to 225*d* and 226*a* to 226*d* to horizontal output lines by controlling the transfer switches 227*a* to 227*d*, 228*a* to 228*d*, 229*a* to 229*d*, and 230*a* to 230*d*. When the control signal PH1(*m*) is activated, the holding capacitors 225*a* and 226*a* are respectively connected to the horizontal output lines 232*a* and 233*a* via the transfer switches 227*a* and 228*a*. That is, the dark level and signal level of the pixel set 212*a* have been input to the input of the readout amplifier 234*a* at this time, and the readout amplifier 234*a* outputs the signal obtained by multiplying the difference by a predetermined gain. Likewise, when the control signal PH1(*m*+1) is activated, the holding capacitors 225*b* and 226*b* are respectively connected to the horizontal output lines 232*b* and 233*b* via the transfer switches 227*b* and 228*b*. The readout amplifier 234*b* then outputs the signal obtained by multiplying the difference between the dark level and signal level of the pixel set 212*b* by a predetermined gain.

When the control signal PH2(*m*+2) is activated between times 3*bt*28 and 3*bt*29, the holding capacitors 225*c* and 226*c* are respectively connected to the horizontal output lines 232*a* and 233*a* via the transfer switches 229*c* and 230*c*. That is, the dark level and signal level of the pixel set 212*c* have been input to the input of the readout amplifier 234*a* at this time, and the readout amplifier 234*a* outputs the signal obtained by multiplying the difference by a predetermined gain. Likewise, when the control signal PH1(*m*+3) is activated, the holding capacitors 225*d* and 226*d* are respectively connected to the horizontal output lines 232*b* and 233*b* via the transfer switches 229*d* and 230*d*. The readout amplifier 234*b* then outputs the signal obtained by multiplying the difference between the dark level and signal level of the pixel set 212*d* by a predetermined gain.

From time 3*bt*29, the apparatus performs the same operation as that in the time interval between times 3*bt*11 and 3*bt*24 with respect to the (n+1)th row, and transfers the signals in the pixel sets 212*e* to 212*h* to the holding capacitors 225*a* to 225*d* and 226*a* to 226*d*, respectively. Thereafter, at the time of operation in the unit of readout for the (n+2)th row, the readout amplifiers 235*a* and 235*b* sequentially output signals in the pixel sets 212*e*, 212*f*, 212*g*, and 212*h*.

Performing the above readout operation for a specific range of the pixel region of the image sensor 101 will output pixel signals necessary for the second image capturing mode. The AFE 103 digitally converts the signals output for the image sensor 101. At this time, since the output terminals 235*c* and 235*d* are not used, and hence the corresponding A/D converters in the AFE 103 are set in the OFF state. Thereafter, the signals are input to the image processing unit 109. Images are consecutively captured and subjected to predetermined processing in the image processing unit 109. The resultant data are then recorded as moving images on the external recording medium 113.

Figure 12B:
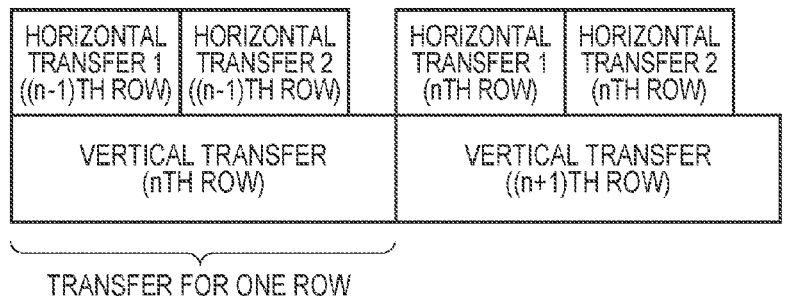

FIG. 12B shows the relationship between the horizontal transfer time and the vertical transfer time in operation in the second image capturing mode described above. In the vertical transfer time, the apparatus performs horizontal transfer twice. Performing horizontal transfer twice separately in this manner allows to use only half of a plurality of readout amplifiers. This makes it possible to stop the supply of power to the other half of the readout amplifiers. In addition, the apparatus may use only half of the plurality of A/D converters which the AFE 103 includes, and can stop the supply of power to the other half of the A/D converters. This can reduce the power consumption at the time of readout operation. In addition, since the readout time for one row is determined by the vertical transfer time, performing horizontal transfer twice separately will not influence the readout speed.

Operation in the third image capturing mode will be described next. First of all, the user operates the GUI operation unit 105 to display a moving image recording size selection window on the display unit 107, as shown in FIG. 4. When the user selects the Full HD moving image mode (third image capturing mode) with the operation unit 105 and presses the moving image capturing switch 105*b*, the CPU 104 makes settings for the third image capturing mode with respect to the image sensor 101 and the TG 102. Thereafter, the CPU 104 outputs an image capturing start signal to the TG 102. The image sensor 101 starts image capturing operation based on a driving signal from the TG 102.

Figure 11:
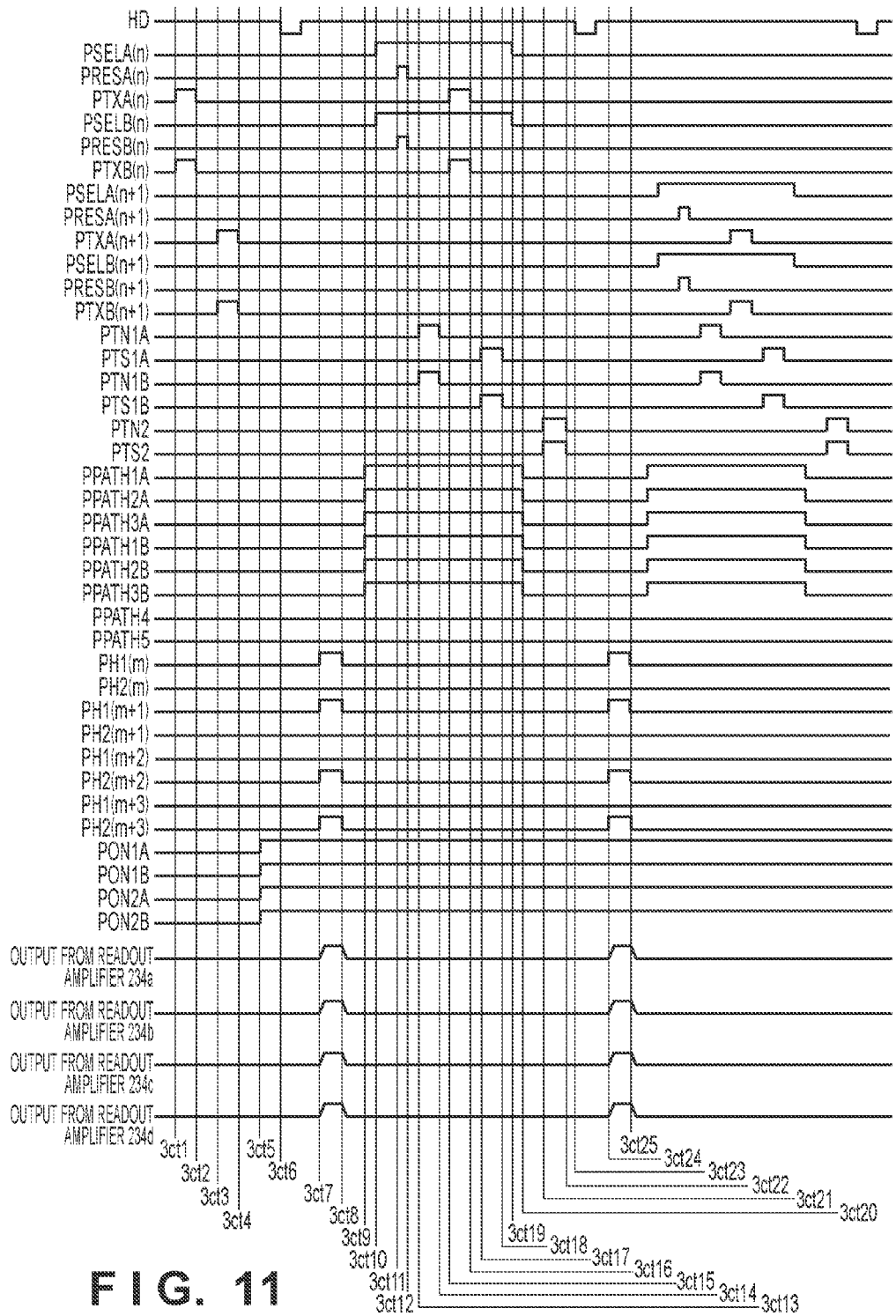
FIG. 11 is a view showing the operation of the image sensor according to the first embodiment.

FIG. 11 shows the operation timing of the image sensor 101 in the third image capturing mode. The operation of each unit will be described with reference to FIG. 11.

Figure 8:
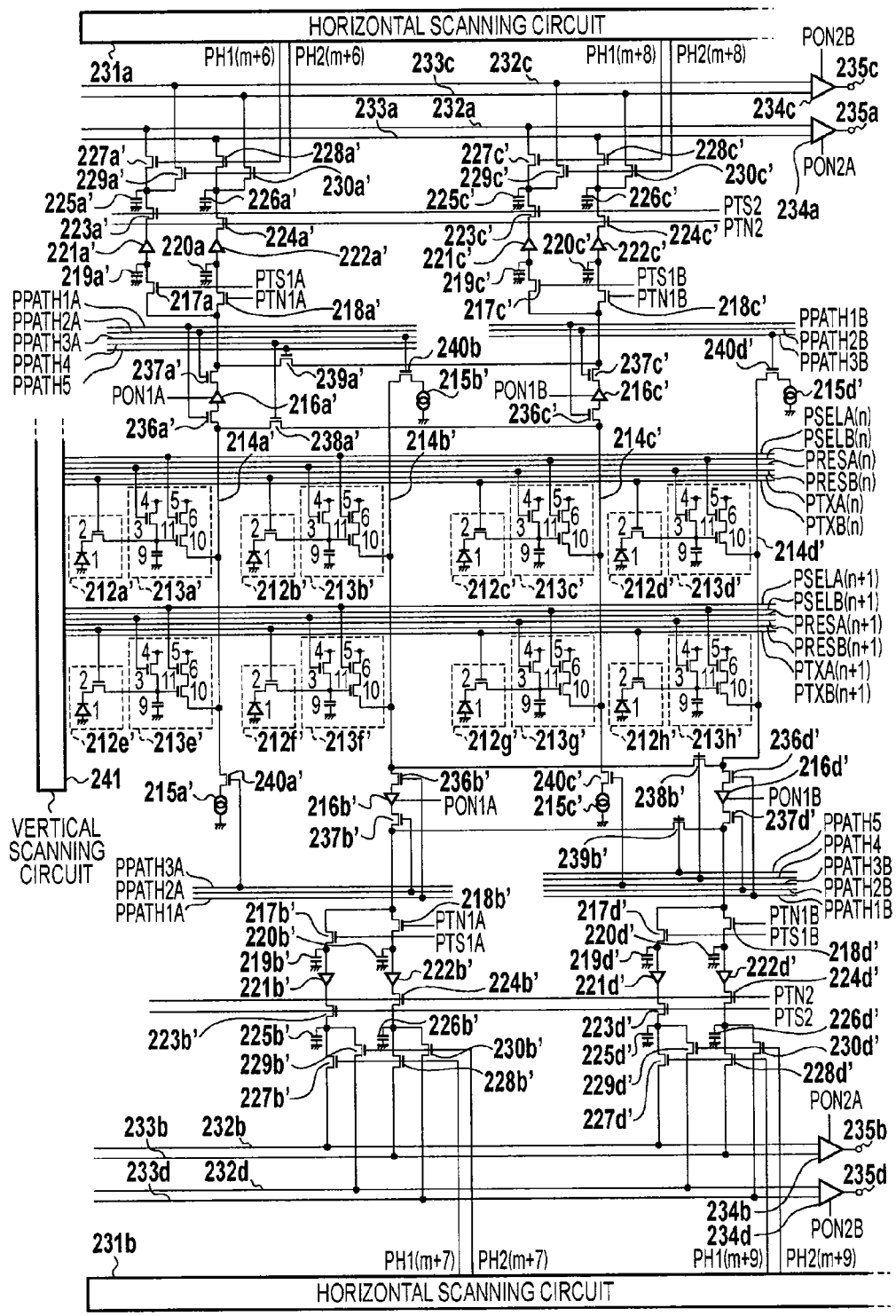
FIG. 8 is a view showing the arrangement of the image sensor according to the first embodiment.

In the third image capturing mode, the apparatus performs the thinning-out reading of reading out pixels on every three columns in the horizontal direction. Therefore, the apparatus reads out pixels arranged on the mth, (m+3)th, (m+6)th, and (m+9)th columns. FIG. 8 shows the arrangement of the (m+6) th to (m+9)th columns. The arrangement of the (m+6)th to (m+9)th columns is the same as that of the mth to (m+3)th columns.

In the third image capturing mode, the apparatus executes slit rolling shutter operation, and operation between times 3*ct*1 and 3*ct*2 is the same as that between times 3*bt*1 and 3*bt*2 in the second image capturing mode. At time 3*ct*5, the control signals PON1A, PON1B, PON2A, and PON2B are activated to turn on the column amplifiers 216*a* to 216*d*, column amplifiers 216*a*' to 216*d*', and the readout amplifiers 234*a* to 234*d*.

The operation of reading out accumulated signal charges then starts, and the timing signal HD indicating the unit of one-row readout operation is asserted at time 3*ct*6. When readout operation starts, the control signals PH1(*m*) and PH1 (*m*+3) are activated in the time interval between times 3*ct*7 and 3*ct*8, and pixel signals on the (n−1)th row which are stored in the holding capacitors 225*a*, 225*d*, 226*a*, and 226*d* are output from the readout amplifiers 234*a* and 234*b* with the operation to be described later. The pixel signals are then output from the output terminals 235*a* and 235*b*. At the same time, control signals PH2(*m*+6) and PH2(*m*+9) are activated. With the operation to be described later, the readout amplifiers 234*c* and 234*d* output pixel signals on the (n−1)th row stored in holding capacitors 225*a*', 225*d*', 226*a*', and 226*d*' on the (m+6)th and (m+9)th columns. Thereafter, the signals are output from the output terminals 235*c* and 235*d*. Output operations corresponding to the number of columns obtained by thinning out columns from all the columns are independently performed until the timing signal HD is asserted next, and do not depend on the vertical transfer timing (to be described later) or the like.

Operation between times 3*ct*9 and 3*ct*22 is the same as that between times 3*bt*11 and 3*bt*24 in the second image capturing mode, and hence a description of the operation will be omitted. In this operation, the apparatus transfers signals in the pixel sets 212*a* and 212*d* and pixel sets 212*a*' and 212*d*' to the holding capacitors 225*a*, 225*d*, 225*a*', 225*d*', 226*a*, 226*d*, 226*a*', and 226*d*'.

With the above operation, one-row operation is complete. At time 3*ct*23, the timing signal HD is asserted. The process then shifts to the next operation.

In the time interval between times 3*ct*24 and 3*ct*25, the horizontal scanning circuits 231*a* and 231*b* perform the operation of connecting the holding capacitors 225*a*, 225*d*, 225*a*', 225*d*', 226*a*, 226*d*, 226*a*', and 226*d*' to horizontal output lines by controlling the transfer switches 227*a* and 227*d*, transfer switches 227*a*' and 227*d*', the transfer switches 228*a* and 228*d*, transfer switches 228*a*' and 228*d*', the transfer switches 229*a* and 229*d*, transfer switches 229*a*' and 229*d*', the transfer switches 230*a* and 230*d*, and transfer switches 230*a*' and 230*d*'. When the control signal PH1(*m*) is activated, the holding capacitors 225*a* and 226*a* are respectively connected to the horizontal output lines 232*a* and 233*a* via the transfer switches 227*a* and 228*a*. That is, the dark level and signal level of the pixel set 212*a* have been input to the input of the readout amplifier 234*a* at this time, and the readout amplifier 234*a* outputs the signal obtained by multiplying the difference by a predetermined gain. Likewise, when the control signal PH1(*m*+3) is activated, the holding capacitors 225*d* and 226*d* are respectively connected to the horizontal output lines 232*b* and 233*b* via the transfer switches 227*d* and 228*d*. The readout amplifier 234*b* then outputs the signal obtained by multiplying the difference between the dark level and signal level of the pixel set 212*d* by a predetermined gain.

Likewise, when the control signals PH2(*m*+6) and PH2(*m*+9) are activated, the readout amplifiers 234*c* and 234*d* then output the signals obtained by multiplying the differences between the dark levels and signal levels of the pixel sets 212*a*' and 212*d*' by predetermined gains.

Performing the above readout operation with respect to all the rows of the image sensor 101 will output pixel signals necessary for the third image capturing mode. The AFE 103 digitally converts the signals output from the image sensor 101. The resultant signals are input to the image processing unit 109. After the image processing unit 109 performs predetermined processing for the signals, the resultant data is recorded as a still image on the external recording medium 113.

Figure 12C:
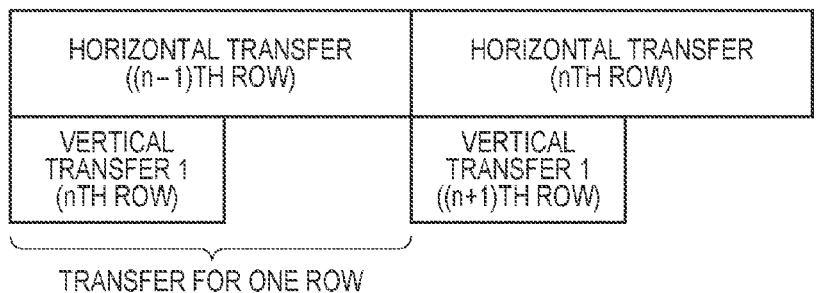

FIG. 12C shows the relationship between the horizontal transfer time and the vertical transfer time in operation in the third image capturing mode described above. In the horizontal transfer time, the apparatus performs vertical transfer once. When a high readout speed is required as in the third image capturing mode, it is possible to output images at a high frame rate by using all the readout circuits provided in the apparatus.

According to the arrangement described in this embodiment, it is possible to reduce the power consumption by selectively ON/OFF-controlling and operating readout circuits in the image sensor for each image capturing mode of the image capture apparatus. In addition, it is possible to provide a required frame rate without influencing the readout speed.

Second Embodiment

The operation of an image capture apparatus according to the second embodiment of the present invention will be described below. Since the arrangement of the image capture apparatus according to this embodiment is the same as that of the image capture apparatus according to the first embodiment, a description of the arrangement will be omitted. The image capture apparatus according to the second embodiment has the same image capturing modes as those described in the first embodiment. An image sensor 101 operates by using different driving methods in the respective image capturing modes.

Figure 13:
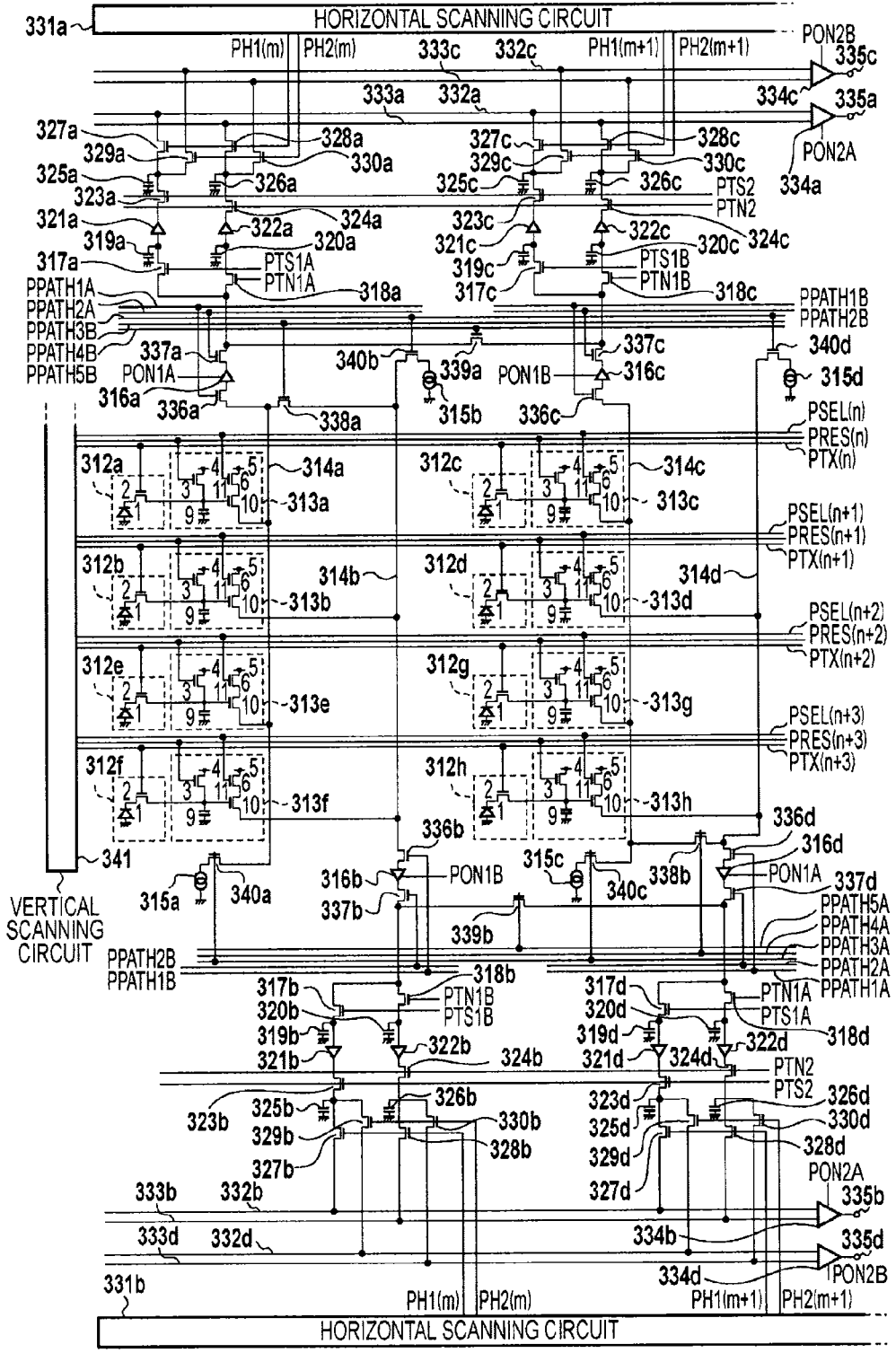
FIG. 13 is a circuit diagram showing the arrangement of an image sensor according to the second embodiment.
Figure 14:
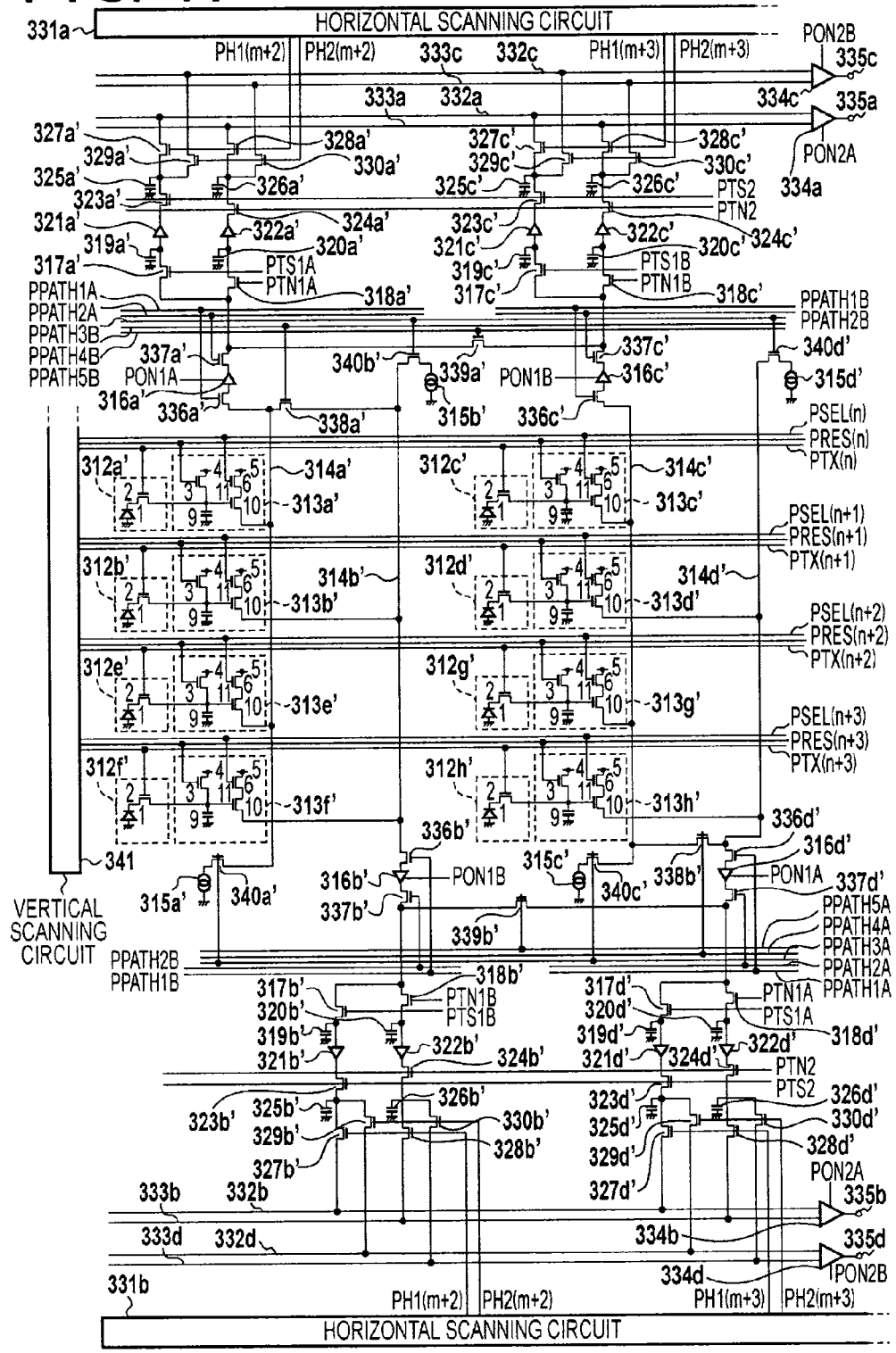
FIG. 14 is a circuit diagram showing the arrangement of the image sensor according to the second embodiment.

Prior to a description of the operation of the image sensor 101 in each image capturing mode, the arrangement of the image sensor 101 in this embodiment will be described with reference to FIG. 13. Referring to FIG. 13, an effective pixel region of the image sensor is formed by pixel sets 312*a*, 312*b*, 312*e*, and 312*f* arranged in the vertical direction. In addition, pixel sets 312*c*, 312*d*, 312*g*, and 312*h* are arranged in the same manner. The effective pixel region is also provided with signal transfer units 313*a* to 313*h*, each including a reset switch 3, a pixel amplifier 10, and a row selection switch 6. The pixel sets 312*a* to 312*h* are respectively connected to the signal transfer units 313*a* to 313*h*.

The gates of transfer switches 2 of the pixel sets 312*a* and 312*c* are connected to a signal line to which a control signal PTX(n) is output from a vertical scanning circuit 341. The gates of the transfer switches 2 of the pixel sets 312*b* and 312*d* are connected to a signal line to which a control signal PTX(n+1) is output. Likewise, the pixel sets 312*e* and 312*g* are connected to a signal line to which a control signal PTX(n+2) is output. The pixel sets 312*f* and 312*h* are connected to a signal line to which a control signal PTX(n+3) is output. Each pixel set includes a photodiode 1 and the transfer switch 2.

The gates of the reset switches 3 of the signal transfer units 313*a* and 313*c* are connected to a signal line to which a control signal PRES(n) is output from the vertical scanning circuit 341. The gates of the row selection switches 6 are connected to a signal line to which a control signal PSEL(n) is output from the vertical scanning circuit 341. The gates of the reset switches 3 of the signal transfer units 313*b* and 313*d* are connected to a control signal PRES(n+1) from the vertical scanning circuit 341. The gates of the row selection switches 6 are connected to a signal line to which a control signal PSEL(n+1) is output from the vertical scanning circuit 341. Likewise, the gates of the reset switches 3 of the signal transfer units 313*e* and 313*g* are connected to a signal line to which a control signal PRES(n+2) is output. The gates of the row selection switches 6 are connected to a signal line to which a control signal PSES(n+2) is output. The gates of the reset switches 3 of the signal transfer units 313*f* and 313*h* are connected to a signal line to which a reset signal PRES(n+3) is output. The gates of the row selection switches 6 are connected to a signal line to which a control signal PSEL(n+3) is output.

In addition, the signal transfer units 313*a* and 313*e* are connected to a vertical output line 314*a* longitudinally extending in the image sensor. Likewise, the signal transfer units 313*b* and 313*f*, 313*c* and 313*g*, and 313*d* and 313*h* are respectively connected to a predetermined number of vertical output lines 314*b*, 314*c*, and 314*d*.

The vertical output lines 314*a* to 314*d* are connected to constant current sources 315*a* to 315*d* via switches 340*a* to 340*d*, and are connected to column amplifiers 316*a* to 316*d* via switches 336*a* to 336*d*. Note that the column amplifiers 316*a* to 316*d* are alternately arranged above and below the effective pixel region. The column amplifiers 316*a* to 316*d* are respectively connected to holding capacitors 319*a* to 319*d* and 320*a* to 320*d* via switches 337*a* to 337*d* and transfer gates 317*a* to 317*d* and 318*a* to 318*d*. Note that a control signal PON1A output from a TG 102 ON/OFF-controls column amplifier 316a and 316d. A control signal PON1B from the TG 102 ON/OFF-controls the column amplifiers 316b and 316c.

The vertical output lines 314a and 314b are connected to each other via a switch 338a. The vertical output lines 314c and 314d are connected to each other via a switch 338b. The outputs of the column amplifiers 316a and 316c are connected to each other via a switch 339a. The outputs of the column amplifiers 316b and 316d are connected to each other via a switch 339b. The following control signals ON/OFF-control these switches in the following manner.

A control signal PPATH1A output from the TG 102 controls the switches 336a and 336d. A control signal PPATH1B controls the switches 336b and 336c. A control signal PPATH2A output from the TG 102 controls the switches 337a and 337d. A control signal PPATH2B controls the switches 337b and 337c.

A control signal PPATH3B output from the TG 102 controls the switches 340b and 340d. A control signal PPATH3A controls the switches 340a and 340c. A control signal PPATH4A output from the TG 102 controls the switch 338b. A control signal PPATH4B output from the TG 102 controls the switch 338a. A control signal PPATH5A controls the switch 339b. A control signal PPATH5B controls the switch 339a.

The holding capacitors 319a to 319d are connected to holding capacitors 325a to 325d via buffers 321a to 321d and transfer gates 323a to 323d. Likewise, the holding capacitors 320a to 320d are connected to holding capacitors 326a to 326d via buffers 322a to 322d and transfer gates 324a to 324d (first signal transfer). The holding capacitors 325a and 326a are connected to horizontal output lines 332a and 333a or horizontal output lines 332c and 333c via output transfer switches 327a, 328a, 329a, and 330a which are driven by a control signal PH1(m) or PH2(m) from a horizontal scanning circuit 331a (second signal transfer). Likewise, the holding capacitors 325b and 326b are connected to the horizontal output lines 332b and 333b or the horizontal output lines 332d and 333d via output transfer switches 327b, 328b, 329b, and 330b driven by a control signal PH1(m) or PH2(m). The holding capacitors 325c and 326c are connected to the horizontal output lines 332a and 333a or the horizontal output lines 332c and 333c via output transfer switches 327c, 328c, 329c, and 330c driven by a control signal PH1 (m+1) or PH2(m+1). The holding capacitors 325d and 326d are connected to the horizontal output lines 332b and 333b or the horizontal output lines 332d and 333d via output transfer switches 327d, 328d, 329d, and 330d driven by a control signal PH1(m+1) or PH2(m+1).

Readout amplifiers 334a to 334d are connected to the horizontal output lines 332a to 332d and 333a to 333d, and output the signals obtained by multiplying the difference outputs obtained by combinations of the horizontal output lines 332a and 333a and the like by predetermined gains. A control signal PON2A output from the TG 102 ON/OFF-controls the readout amplifiers 334a and 334b. A control signal PON2b output from the TG 102 ON/OFF-controls the readout amplifiers 334c and 334d. Outputs from these readout amplifiers are output from output terminals 335a to 335d of the image sensor.

The operation of the image sensor in each mode will be described next. First of all, when the user presses a still image capturing switch 105a shown in FIG. 3, a CPU 104 makes settings for still image capturing (the first image capturing mode) with respect to the image sensor 101 and the TG 102. Thereafter, the CPU 104 outputs an image capturing start signal to the TG 102, and the image sensor 101 starts image capturing operation based on a driving signal from the TG 102.

Figure 15:
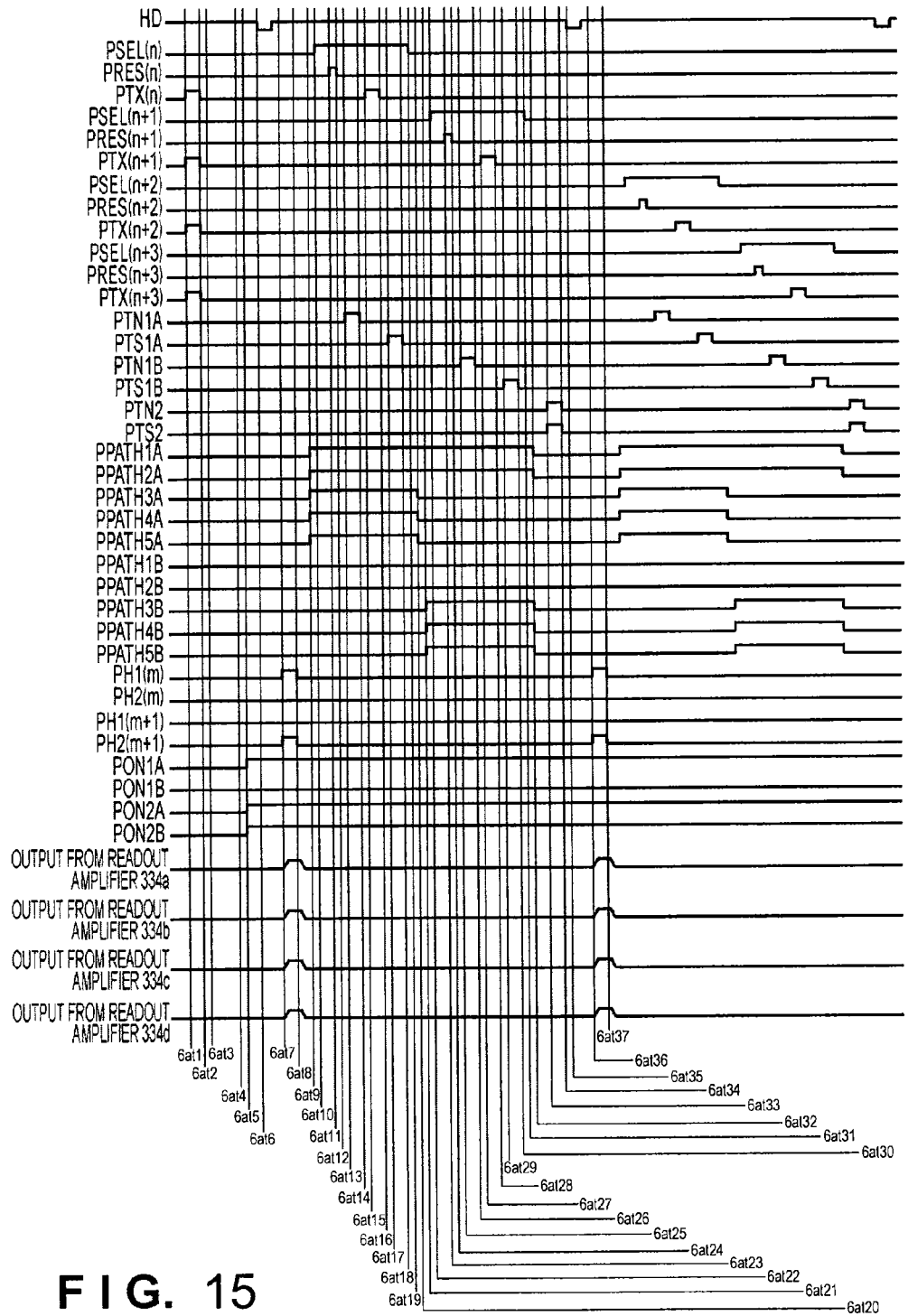
FIG. 15 is a view showing the operation of the image sensor according to the second embodiment.

FIG. 15 is a view showing the operation timing of the image sensor 101 in the first image capturing mode. The operation of each unit will be described with reference to FIG. 15. In the time interval between times 6at1 and 6at2 corresponding to an all-pixel reset period, the control signals PTX (n), PTX(n+1), PTX(n+2), and PTX(n+3) are activated. This case shows only control signals for specific rows. In this period, however, control signals PTX for all the rows are activated, and the charges in photodiodes 1 of all the pixel sets are transferred to gates 11 of the pixel amplifiers 10 via the transfer switches 2. The photodiodes 1 are then reset.

Thereafter, at time 6at3, all the pixels simultaneously start accumulating charges. At time 6at4, a mechanism (not shown) outside the image sensor shields against light applied to the image sensor. The time interval between times 6at3 and 6at4 corresponds to an accumulation period. In this state, signal charges are accumulated in the photodiodes 1. In this case, all the pixels simultaneously start accumulating charges. However, the present invention is not limited to this arrangement. An arrangement for resetting the photodiodes 1 can be arbitrarily designed. For example, different reset timings may be set for the respective TOWS.

At time 6at5, the control signals PON1A, PON2A, and PON2B are activated to turn on the column amplifiers 316a and 316d and the readout amplifiers 334a to 334d.

The operation of reading out accumulated signal charges then starts, and a timing signal HD indicating the unit of one-row readout operation is asserted at time 6at6. When readout operation starts, the control signals PH1(m) and PH2 (m+2) are activated in the time interval between times 6at7 and 6at8. Pixel signals on the (n−1)th row which are stored in the holding capacitors 325a to 325d and 326a to 326d are output from the readout amplifiers 334a to 334d with the operation to be described later. The pixel signals are then output from the output terminals 335a to 335d. Although a specific case is described, signals are sequentially output from all the columns in the same manner. Output operations corresponding to all the columns are independently performed until the timing signal HD is asserted next, and do not depend on the vertical transfer timing (to be described later) or the like.

The apparatus performs vertical transfer of the pixel sets 312a and 312c arranged on the nth row. At time 6at9, the control signals PPATH1A, PPATH2A, PPATH4A, and PPATH5A are activated to activate paths for the vertical transfer of signals from the pixel sets 312a and 312c. In addition, the control signal PPATH3A is activated to connect the vertical output lines 314a and 314c to the current sources 315a and 315c. At time 6at10, the control signal PSEL(n) is activated to turn on the row selection switches 6. The source follower circuits respectively constituted by the pixel amplifiers 10 of the signal transfer units 313a and 313c and the current sources 315a and 315c connected to the respective vertical output lines are set in the operating state.

At time 6at11, the control signal PRES(n) is activated to turn on the reset switches 3, thereby initializing the gates 11 of the pixel amplifiers 10 of the signal transfer units 313a and 313c, that is, capacitors 9. That is, signals of the signal level immediately after this resetting operation (so-called dark level) are output to the vertical output lines 314a and 314c.

At time 6at12, the control signal PRES(n) is negated. Thereafter, at time 6at13, the control signal PTN1A is activated. This turns on the transfer gates 318a and 318b connected to the outputs of the column amplifiers 316a and 316d connected to the vertical output lines 314a and 314c, thereby holding the dark level output in each of the holding capacitors 320a and 320b. Thereafter, the transfer operation is complete at time 6at14, and the control signal PTX(n) is activated at time 6at15 to turn on the transfer switches 2 of the pixel sets 312a and 312c. The signal charges accumulated in the photodiodes 1 are then transferred to the gates 11 of the source followers formed by the pixel amplifiers 10 of the signal transfer units 313a and 313c. At this time, the signal level of each source follower formed by the pixel amplifier 10 changes from the reset level by an amount corresponding to the signal charge transferred to the source follower. As a consequence, the signal level is settled.

At time 6at16 when the transfer operation is sufficiently complete, the control signal PTX(n) is negated. At time 6at17, a control signal PTS1A is activated. This turns on the transfer gates 317a and 317b connected to the outputs of the column amplifiers 316a and 316d connected to the vertical output lines 314a and 314c, thereby holding the signal level in the holding capacitors 319a and 319b. When the control signal PTS1A is negated thereafter at time 6at18, the transfer operation is complete.

With the above operation, the holding capacitors 319a and 319b hold the signal level of the pixel sets 312a and 312c, and the holding capacitors 320a and 320b hold the dark level of the pixel sets 312a and 312c.

Since the output of signals from the pixels is complete, the selection control signal PSEL(n) is negated at time 6at19. At time 6at20, the control signals PPATH3A, PPATH4A, and PPATH5A are negated to disconnect the vertical output lines 314a and 314c from the current sources 315a and 315c.

The apparatus then performs vertical transfer of the pixel sets 312b and 312d arranged on the (n+1)th row. At time 6at21, the control signal PPATH3B is activated to connect the vertical output lines 314b and 314d to the current sources 315b and 315d. In addition, the control signals PPATH4B and PPATH5B are activated to activate paths for the vertical transfer of signals from the pixel sets 312b and 312d. Subsequently, at time 6at22, the control signal PSEL(n+1) is activated to turn on the row selection switches 6. The source follower circuits respectively constituted by the pixel amplifiers 10 of the signal transfer units 313b and 313d and the current sources 315b and 315d connected to the respective vertical output lines are set in the operating state.

At time 6at23, the control signal PRES(n+1) is activated to turn on the reset switches 3 to initialize the gates 11 of the pixel amplifiers 10 of the signal transfer units 313b and 313d, that is, the capacitors 9. That is, signals of the signal level immediately after this resetting operation (so-called dark level) are output to the vertical output lines 314b and 314d.

After the control signal PRES(n+1) is negated at time 6at24, the control signal PTN1B is activated at time 6at25. This turns on the transfer gates 318c and 318d connected to the outputs of the column amplifiers 316a and 316d connected to the vertical output lines 314b and 314d, thereby holding the dark level output in each of the holding capacitors 320c and 320d. Thereafter, the transfer operation is complete at time 6at26, and the control signal PTX(n+1) is activated at time 6at27 to turn on the transfer switches 2 of the pixel sets 312b and 312d. The signal charges accumulated in the photodiodes 1 are then transferred to the gates 11 of the source followers formed by the pixel amplifiers 10 of the signal transfer units 313b and 313d. At this time, the signal level of the gate 11 of each source follower formed by the pixel amplifier 10 changes from the reset level by an amount corresponding to the signal charge transferred to the source follower. As a consequence, the signal level is settled.

At time 6at28 when the transfer operation is sufficiently complete, the control signal PTX(n+1) is negated. At time 6at29, a control signal PTS1B is activated. This turns on the transfer gates 317c and 317d connected to the outputs of the column amplifiers 316a and 316d connected to the vertical output lines 314b and 314d, thereby holding the signal level in the holding capacitors 319c and 319d. When the control signal PTS1B is negated thereafter at time 6at30, the transfer operation is complete.

With the above operation, the holding capacitors 319c and 319d hold the signal level of the pixel sets 312b and 312d, and the holding capacitors 320c and 320d hold the dark level of the pixel sets 312b and 312d.

Since the output of signals from the pixels is complete, the selection control signal PSEL(n+1) is negated at time 6at31. At time 6at32, the control signals PPATH1A, PPATH2A, PPATH3B, PPATH4B, and PPATH5B are negated. With the above operation, the vertical transfer of all the pixel sets on the nth and (n+1)th rows is complete.

At time 6at33, the control signals PTS2 and PTN2 are activated to turn on the transfer gates 323a to 323d and 324a to 324d connected to the outputs of the buffers 321a to 321d and 322a to 322d connected to the holding capacitors 319a to 319d and 320a to 320d. This transfers the charges held in the holding capacitors 319a to 319d and 320a to 320d to the holding capacitors 325a to 325d and 326a to 326d. When the control signals PTS2 and PTN2 are negated at time 6at34, the transfer operation is complete. Note that at time 3at33, all the signals on the (n−1)th and (n−2)th rows which are held in the holding capacitors 325a to 325d and 326a to 326d are output from the output terminals 335a to 335d.

With the above operation, one-row operation is complete. At time 3at35, the timing signal HD is asserted. The process then shifts to the next operation.

In the time interval between times 6at36 and 6at37, the horizontal scanning circuits 331a and 331b perform the operation of connecting the holding capacitors 325a to 325d and 326a to 326d to horizontal output lines by controlling the transfer switches 327a to 327d, 328a to 328d, 329a to 329d, and 330a to 330d. When the control signal PH1(m) is activated, the holding capacitors 325a and 326a are respectively connected to the horizontal output lines 332a and 333a via the transfer switches 327a and 328a. That is, the dark level and signal level of the pixel set 312a have been input to the input of the readout amplifier 334a at this time, and the readout amplifier 334a outputs the signal obtained by multiplying the difference by a predetermined gain. Likewise, the holding capacitors 325b and 326b are respectively connected to the horizontal output lines 332b and 333b via the transfer switches 327b and 328b. The readout amplifier 334b then outputs the signal obtained by multiplying the difference between the dark level and signal level of the pixel set 312c by a predetermined gain.

When the control signal PH2(m+1) is activated, the holding capacitors 325c and 326c are respectively connected to the horizontal output lines 332c and 333c via the transfer switches 327c and 328c. That is, the dark level and signal level of the pixel set 312b have been input to the input of the readout amplifier 334c at this time, and the readout amplifier 334c outputs the signal obtained by multiplying the difference by a predetermined gain. Likewise, the holding capacitors 325d and 326d are respectively connected to the horizontal output lines 332d and 333d via the transfer switches 327d and 328d. The readout amplifier 334d then outputs the signal obtained by multiplying the difference between the dark level and signal level of the pixel set 312d by a predetermined gain.

From time 6at37, the apparatus performs the same operation as that in the time interval between times 6at9 and 6at34 with respect to the (n+2)th and (n+3)th rows, and transfers the signals in the pixel sets 312e, 312g, 312f, and 312h to the holding capacitors 325a to 325d and 326a to 326d, respectively. Thereafter, at the time of operation in the unit of readout for the (n+4)th and (n+5)th rows, the readout amplifiers 335a to 335d output signals in the pixel sets 312e, 312g, 312f, and 312h.

Performing the above readout operation with respect to all the rows of the image sensor 101 will output signals from all the pixels arrayed on the image sensor 101. An AFE 103 digitally converts the signals output from the image sensor 101. The resultant signals are input to an image processing unit 109. After the image processing unit 109 performs predetermined processing for the signals, the resultant data is recorded as a still image on an external recording medium 113.

Figure 18A:
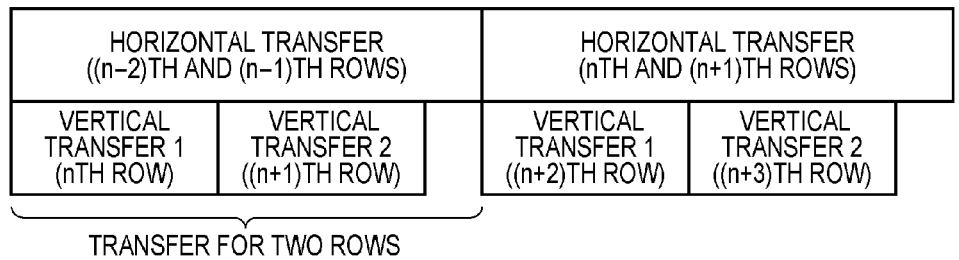
FIGS. 18A to 18C are views showing the operation of the image sensor according to the second embodiment.

FIG. 18A shows the relationship between the horizontal transfer time and the vertical transfer time in operation in the first image capturing mode described above. In the horizontal transfer time, the apparatus performs vertical transfer twice separately time-serially. Performing vertical transfer twice separately in this manner allows to use only half of a plurality of column amplifiers. This makes it possible to stop the supply of power to the other half of the column amplifiers. This can reduce the power consumption at the time of readout operation. In addition, since the readout time for one row is determined by the horizontal transfer time, performing vertical transfer twice separately will not influence the readout speed.

Operation in the second image capturing mode will be described next. First of all, the user operates a GUI operation unit 105 to display a moving image recording size selection window on a display unit 107, as shown in FIG. 4. When the user selects the VGA crop moving image mode (second image capturing mode) with the GUI operation unit 105 and presses a moving image capturing switch 105b, the CPU 104 makes settings for the second image capturing mode with respect to the image sensor 101 and the TG 102. Thereafter, the CPU 104 outputs an image capturing start signal to the TG 102. The image sensor 101 starts image capturing operation based on a driving signal from the TG 102.

Figure 16:
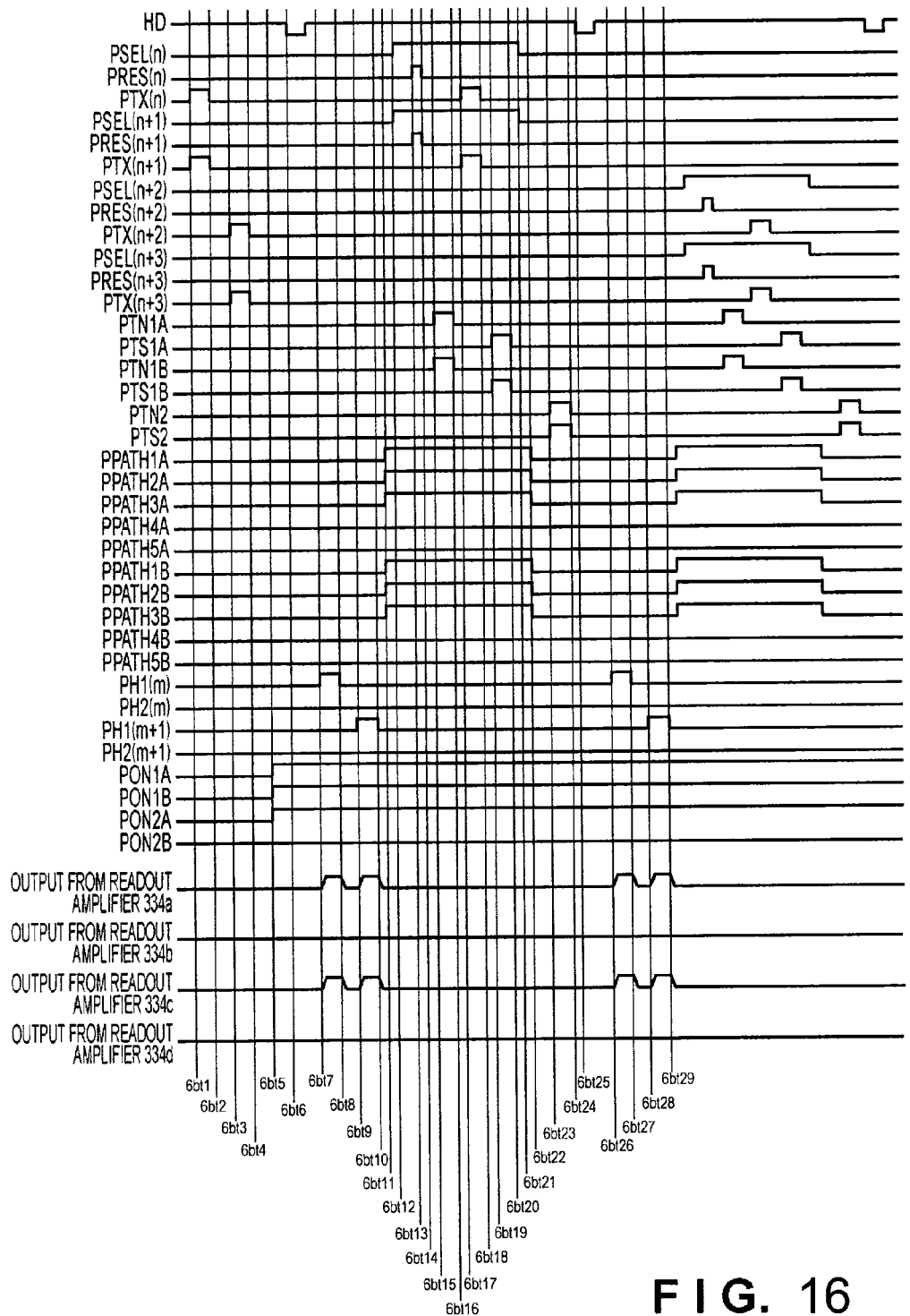
FIG. 16 is a view showing the operation of the image sensor according to the second embodiment.

FIG. 16 shows the operation timing of the image sensor 101 in the second image capturing mode. The operation of each unit will be described with reference to FIG. 16.

In the second image capturing mode, the apparatus executes slit rolling shutter operation, that is, vertical transfer twice in one image capturing operation. In the first vertical scan, the apparatus resets each pixel to start charge accumulation. In the second vertical scan, the apparatus finishes the charge accumulation and outputs signals. The time interval between times 6bt1 and 6bt2 corresponds to a reset period for the pixels arranged on the nth and (n+1)th rows. In this period, the control signals PTX(n) and PTX(n+1) are activated. The time interval from this pixel reset operation to the vertical transfer of pixel signals corresponds to an accumulation time. The vertical transfer timings for pixel signals on the (n+2) and (n+3)th rows sequentially shift backward from those on the nth and (n+1)th rows. For this reason, the control signals PTX(n+2) and PTX(n+3) are activated to perform resetting operation between times 6bt3 and 6bt4 so as to make the accumulation time equal to that on the nth row. When the control signal PTX is activated, the charge in the photodiode 1 is transferred to the gate 11 of the pixel amplifier 10 via the transfer switch 2, and the photodiode 1 is reset.

At time 6bt5, the control signals PON1A, PON1B, and PON2A are activated to turn on the column amplifiers 316a to 316d and the readout amplifiers 334a and 334b.

The operation of reading out accumulated signal charges then starts. At time 6bt6, the timing signal HD indicating the unit of one-row readout operation is asserted. When the readout operation starts, the control signal PH1(m) is activated between times 6bt7 and 6bt8. With the operation to be described later, the readout amplifiers 334a and 334b output pixel signals on the (n−2)th row/(m−2)th column and the (n−2)th row/(m−1)th column stored in the holding capacitors 325a, 325b, 326a, and 326b. Thereafter, the signals are output from the output terminals 335a and 335b.

The control signal PH1(m+1) is activated between times 6bt9 and 6bt10. With the operation to be described later, the readout amplifiers 334a and 334b output pixel signals on the (n−1)th row/(m−2)th column and the (n−1)th row/(m−1)th column stored in the holding capacitors 325c, 325d, 326c, and 326d. Thereafter, the signals are output from the output terminals 335a and 335b. Although a specific case is described, signals are sequentially output from all the columns in the same manner. Output operations corresponding to all the columns are independently performed until the timing signal HD is asserted next, and do not depend on the vertical transfer timing (to be described later) or the like.

The pixel sets 312a and 312b arranged on the nth row perform vertical transfer. At time 6bt11, the control signals PPATH1A, PPATH2A, PPATH1B, and PPATH2B are activated to activate paths for the vertical transfer of signals from the pixel sets 312a to 312d via the column amplifiers 316a to 316d. At the same time, the control signal PPATH3A is activated to connect the vertical output lines 314a and 314c to the current sources 315a and 315c. In addition, the control signal PPATH3B is activated to connect the vertical output lines 314b and 314d to the current sources 315b and 315d. Subsequently, at time 6bt12, the control signals PSEL(n) and PSEL(n+1) are activated to turn on the row selection switches 6. The source follower circuits respectively constituted by the pixel amplifiers 10 of the signal transfer units 313a to 313d and the current sources 315a to 315d connected to the respective vertical output lines are set in the operating state.

At time 6bt13, the control signals PRES(n) and PRES(n+1) are activated to turn on the reset switches 3, thereby initializing the gates 11 of the pixel amplifiers 10 of the signal transfer units 313a to 313d, that is, capacitors 9. That is, signals of the signal level immediately after this resetting operation (so-called dark level) are output to the vertical output lines 314a to 314d.

At time 6bt14, the control signals PRES(n) and PRES(n+1) are negated. Thereafter, at time 6bt15, the control signals PTN1A and PTN1B are activated. This turns on the transfer gates 318a to 318d connected to the outputs of the column amplifiers 316a to 316d connected to the vertical output lines 314a to 314d, thereby holding the dark level output in each of the holding capacitors 320a to 320d. Thereafter, the transfer operation is complete at time 6bt16, and the control signals PTX(n) and PTX(n+1) are activated at time 6bt17 to turn on the transfer switches 2 of the pixel sets 312a to 312d. The signal charges accumulated in the photodiodes 1 are then transferred to the gates 11 of the source followers formed by the pixel amplifiers 10 of the signal transfer units 313a to 313d. At this time, the signal level of each source follower formed by the pixel amplifier 10 changes from the reset level by an amount corresponding to the signal charge transferred to the source follower. As a consequence, the signal level is settled.

At time 6bt18 when the transfer operation is sufficiently complete, the control signals PTX(n) and PTX(n+1) are negated. At time 6bt19, the control signals PTS1A and PTS1B are activated. This turns on the transfer gates 317a to 317d connected to the outputs of the column amplifiers 316a to 316d connected to the vertical output lines 314a to 314d, thereby holding the signal level in the holding capacitors 319a to 319d. When the control signals PTS1A and PTS1B are negated thereafter at time 6bt20, the transfer operation is complete.

With the above operation, the holding capacitors 319a to 319d hold the signal level of the pixel sets 312a to 312d, and the holding capacitors 320a to 320d hold the dark level of the pixel sets 312a to 312d.

Since the output of signals from the pixels is complete, the selection control signals PSEL(n) and PSEL(n+1) are negated at time 6at21. At time 6at22, the control signals PPATH1A, PPATH2A, PPATH3A, PPATH1B, PPATH2B, and PPATH3B are negated. With the above operation, the vertical transfer of all the pixel sets on the (n+1)th row is complete.

At time 6bt23, the control signals PTS2 and PTN2 are activated to turn on the transfer gates 323a to 323d and 324a to 324d connected to the outputs of the buffers 321a to 321d and 322a to 322d connected to the holding capacitors 319a to 319d and 320a to 320d. This transfers the charges held in the holding capacitors 319a to 319d and 320a to 320d to the holding capacitors 325a to 325d and 326a to 326d. When the control signals PTS2 and PTN2 are negated at time 6bt24, the transfer operation is complete. Note that at time 6bt23, all the signals on the (n−2)th and (n−1)th rows which are held in the holding capacitors 325a to 325d and 326a to 326d are output from the output terminals 335a to 335d.

With the above operation, one-row operation is complete. At time 6bt25, the timing signal HD is asserted. The process then shifts to the next operation.

In the time interval between times 6at26 and 6at27, the horizontal scanning circuits 331a and 331b perform the operation of connecting the holding capacitors 325a to 325d and 326a to 326d to horizontal output lines by controlling the transfer switches 327a to 327d, 328a to 328d, 329a to 329d, and 330a to 330d. When the control signal PH1(m) is activated, the holding capacitors 325a and 326a are respectively connected to the horizontal output lines 332a and 333a via the transfer switches 327a and 328a. That is, the dark level and signal level of the pixel set 312a have been input to the input of the readout amplifier 334a at this time, and the readout amplifier 334a outputs the signal obtained by multiplying the difference by a predetermined gain. Likewise, the holding capacitors 325b and 326b are respectively connected to the horizontal output lines 332b and 333b via the transfer switches 327b and 328b. The readout amplifier 334b then outputs the signal obtained by multiplying the difference between the dark level and signal level of the pixel set 312b by a predetermined gain.

When the control signal PH1(m+1) is activated between times 6bt28 and 6bt29, the holding capacitors 325c and 326c are respectively connected to the horizontal output lines 332a and 333a via the transfer switches 329c and 330c. That is, the dark level and signal level of the pixel set 312c have been input to the input of the readout amplifier 334a at this time, and the readout amplifier 334a outputs the signal obtained by multiplying the difference by a predetermined gain. Likewise, the holding capacitors 325d and 326d are respectively connected to the horizontal output lines 332b and 333b via the transfer switches 329d and 330d. The readout amplifier 334b then outputs the signal obtained by multiplying the difference between the dark level and signal level of the pixel set 312d by a predetermined gain.

From time 6bt29, the apparatus performs the same operation as that in the time interval between times 6bt11 and 6bt24 with respect to the (n+2)th row, and transfers the signals in the pixel sets 312e to 312h to the holding capacitors 325a to 325d and 326a to 326d, respectively. Thereafter, at the time of operation in the unit of readout for the (n+3)th row, the readout amplifiers 335a and 335b sequentially output signals in the pixel sets 312e, 312f, 312g, and 312h.

Performing the above readout operation for a specific range of the pixel region of the image sensor 101 will output pixel signals necessary for the second image capturing mode. The AFE 103 digitally converts the signals output for the image sensor 101. At this time, since the output terminals 335c and 335d are not used, and hence the corresponding A/D converters in the AFE 103 are set in the OFF state. Thereafter, the signals are input to the image processing unit 109. Images are consecutively captured and subjected to predetermined processing in the image processing unit 109. The resultant data are then recorded as moving images on the external recording medium 113.

Figure 18B:
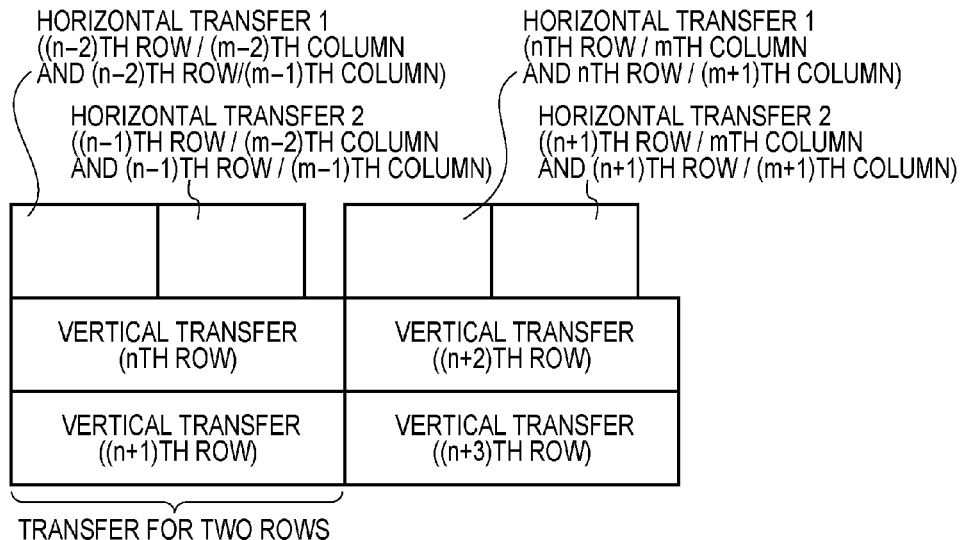

FIG. 18B shows the relationship between the horizontal transfer time and the vertical transfer time in operation in the second image capturing mode described above. In the vertical transfer time, the apparatus performs horizontal transfer twice time-serially. Performing horizontal transfer twice separately in this manner allows to use only half of a plurality of readout amplifiers. This makes it possible to stop the supply of power to the other half of the readout amplifiers. In addition, the apparatus may use only half of the plurality of A/D converters which the AFE 103 includes, and can stop the supply of power to the other half of the A/D converters. This can reduce the power consumption at the time of readout operation. In addition, since the readout time for one row is determined by the vertical transfer time, performing horizontal transfer twice separately will not influence the readout speed. In other words, in the second image capturing mode (second power save mode), the apparatus performs control during a vertical transfer period for a plurality of columns so as to execute a plurality of horizontal transfers equal in number to the number of columns transferred during the vertical transfer period and to execute horizontal transfer corresponding to the number of rows (two rows or a plurality of rows) equal in number to the number of columns vertically transferred by performing horizontal transfer a plurality of number of times via specific readout amplifiers of the readout amplifiers provided in the image sensor, without supplying any power to the readout amplifiers which are not used in the horizontal transfer period.

Operation in the third image capturing mode will be described next. First of all, the user operates the GUI operation unit 105 to display a moving image recording size selection window on the display unit 107, as shown in FIG. 4. When the user selects the Full HD moving image mode (third image capturing mode) with the GUI operation unit 105 and presses the moving image capturing switch 105b, the CPU 104 makes settings for the third image capturing mode with respect to the image sensor 101 and the TG 102. Thereafter, the CPU 104 outputs an image capturing start signal to the TG 102. The image sensor 101 starts image capturing operation based on a driving signal from the TG 102.

Figure 17:
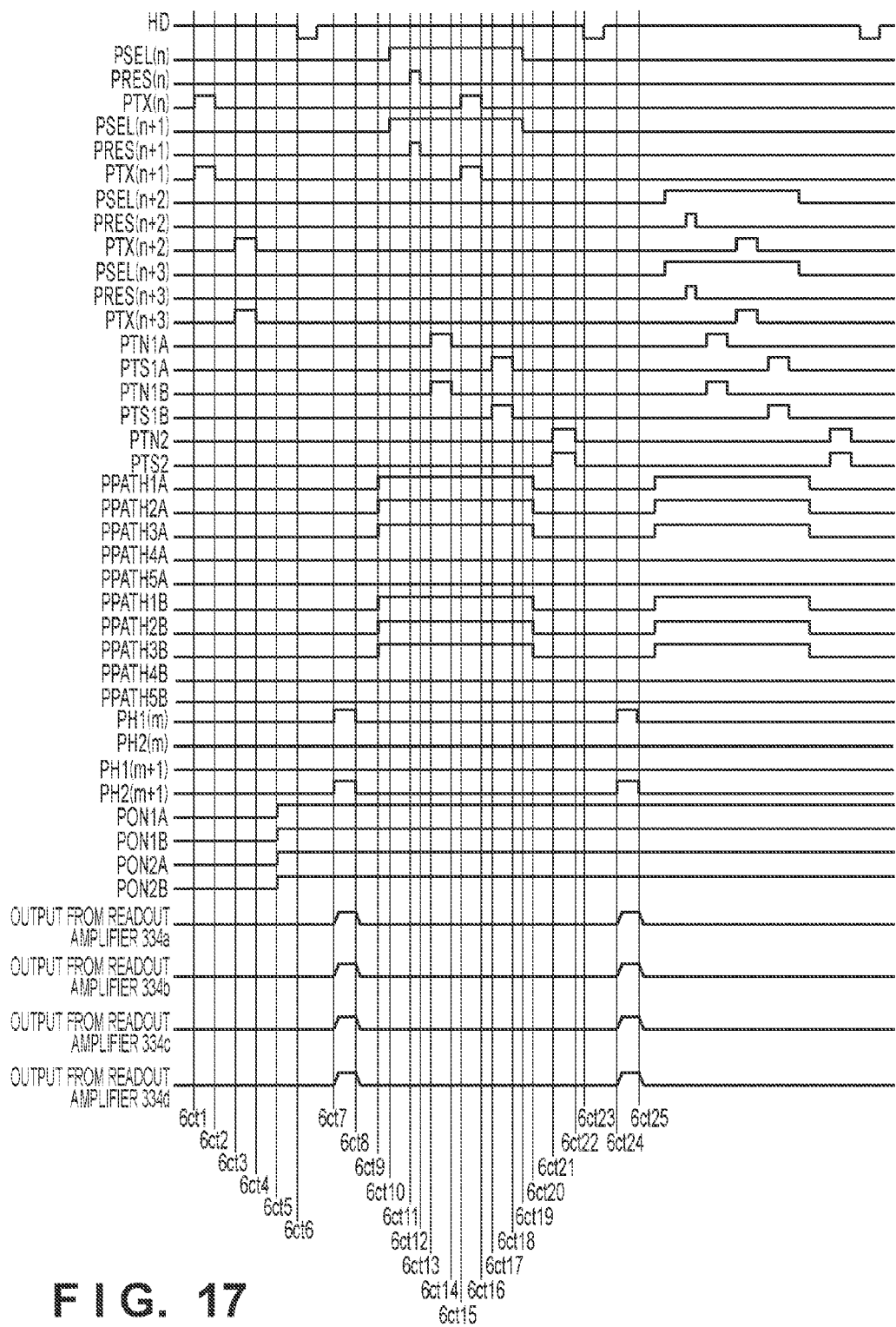
FIG. 17 is a view showing the operation of the image sensor according to the second embodiment.

FIG. 17 shows the operation timing of the image sensor 101 in the third image capturing mode. The operation of each unit will be described with reference to FIG. 17.

In the third image capturing mode, the apparatus performs the thinning-out reading of reading out pixels on every three columns in the horizontal direction. Therefore, the apparatus reads out pixels arranged on the mth and (m+3)th columns. FIG. 8 shows the arrangement of the (m+2)th and (m+3)th columns. The arrangement of the (m+2)th and (m+3)th columns is the same as that of the mth and (m+1)th columns.

In the third image capturing mode, the apparatus executes slit rolling shutter operation, and operation between times 6ct1 and 6ct2 is the same as that between times 6bt1 and 6bt2 in the second image capturing mode. At time 6ct5, the control signals PON1A, PON1B, PON2A, and PON2B are activated to turn on the column amplifiers 316a to 316d and column amplifiers 316a' to 316d' and the readout amplifiers 334a to 334d.

The operation of reading out accumulated signal charges then starts, and the timing signal HD indicating the unit of one-row readout operation is asserted at time 6ct6. When readout operation starts, the control signal PH1(m) is activated in the time interval between times 6ct7 and 6ct8, and pixel signals on the (n−1)th row which are stored in the holding capacitors 325a, 325b, 326a, and 326b are output from the readout amplifiers 334a and 334b with the operation to be described later. The pixel signals are then output from the output terminals 335a and 335b. At the same time, control signal PH2(m+3) is activated. With the operation to be described later, the readout amplifiers 334c and 334d output pixel signals on the (n−1)th row stored in holding capacitors 325c', 325d', 326c', and 326d' on the (m+3)th column. Thereafter, the signals are output from the output terminals 335c and 335d. Output operations corresponding to the number of columns obtained by thinning out columns from all the columns are independently performed until the timing signal HD is asserted next, and do not depend on the vertical transfer timing (to be described later) or the like.

Operation between times 6ct9 and 6ct22 is the same as that between times 6bt11 and 6bt24 in the second image capturing mode, and hence a description of the operation will be omitted. In this operation, the apparatus transfers signals in the pixel sets 312a and 312d and pixel sets 312a' and 312d' to the holding capacitors 325a, 325b, 325c', 325d', 326a, 326b, 326c', and 326d'.

With the above operation, one-row operation is complete. At time 6ct23, the timing signal HD is asserted. The process then shifts to the next operation.

In the time interval between times 6ct24 and 6ct25, the horizontal scanning circuits 331a and 331b perform the operation of connecting the holding capacitors 325a, 325b, 325c', 325d', 326a, 326b, 326c', and 326d' to horizontal output lines by controlling the transfer switches 327a and 327b, transfer switches 327c' and 327d', the transfer switches 328a and 328b, transfer switches 328c' and 328d', the transfer switches 329a and 329b, transfer switches 329c' and 329d', the transfer switches 330a and 330b, and transfer switches 330c' and 330d'. When the control signal PH1(m) is activated, the holding capacitors 325a and 326a are respectively connected to the horizontal output lines 332a and 333a via the transfer switches 327a and 328a. That is, the dark level and signal level of the pixel set 312a have been input to the input of the readout amplifier 334a at this time, and the readout amplifier 334a outputs the signal obtained by multiplying the difference by a predetermined gain. Likewise, the holding capacitors 325b and 326b are respectively connected to the horizontal output lines 332b and 333b via the transfer switches 327b and 328b. The readout amplifier 334b then outputs the signal obtained by multiplying the difference between the dark level and signal level of the pixel set 312b by a predetermined gain. Likewise, when the control signal PH2(m+3) is activated, the readout amplifiers 334c and 334d then output the signals obtained by multiplying the differences between the dark levels and signal levels of the pixel sets 312c' and 312d' by predetermined gains.

Performing the above readout operation with respect to all the rows of the image sensor 101 will output pixel signals necessary for the third image capturing mode. The AFE 103 digitally converts the signals output from the image sensor 101. The resultant signals are input to the image processing unit 109. After the image processing unit 109 performs predetermined processing for the signals, the resultant data is recorded as a still image on the external recording medium 113.

Figure 18C:
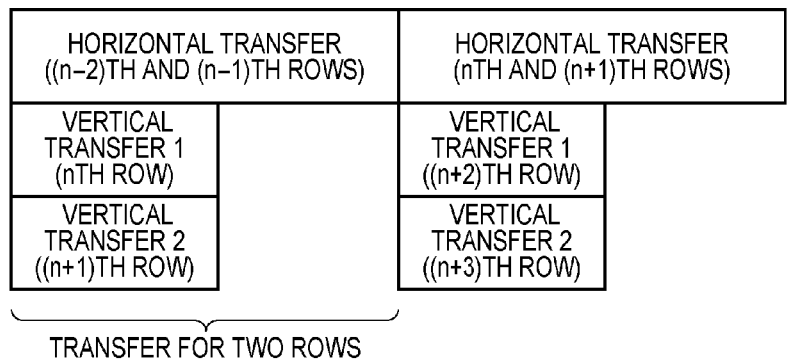

FIG. 18C shows the relationship between the horizontal transfer time and the vertical transfer time in operation in the third image capturing mode described above. In the horizontal transfer time, the apparatus performs vertical transfer once. When a high readout speed is required as in the third image capturing mode, it is possible to output images at a high frame rate by using all the readout circuits provided in the apparatus.

According to the arrangement described in this embodiment, it is possible to reduce the power consumption by selectively ON/OFF-controlling and operating readout circuits in the image sensor for each image capturing mode of the image capture apparatus. In addition, it is possible to provide a required frame rate without influencing readout speed.

The present invention has been described in detail above based on the preferred embodiments. However, the present invention is not limited to these specific embodiments. The present invention incorporates various forms within the scope of the invention. It is possible to combine some of the above embodiments as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-095277, filed Apr. 21, 2011, which is hereby incorporated by reference herein in its entirety.

What is claimed is:

1. An image capture apparatus comprising:
an image sensor which photoelectrically converts an object image;
determination unit configured to determine one image capturing mode from a plurality of image capturing modes;
driving unit configured to drive said image sensor by different driving methods in the respective image capturing modes determined by said determination unit; and
control unit configured to control operation of said driving unit,
wherein said image sensor includes a plurality of two-dimensionally arrayed pixels, a plurality of column output lines, and a plurality of holding units which hold pixel signals output from the plurality of pixels via the column output lines, and
said control unit drives said image sensor in a first power save mode in a case that a horizontal transfer period in which pixel signals stored in the holding units are sequentially output outside said image sensor is not less than twice a vertical transfer period in which pixel signals from pixels are held in the holding units via the column output lines, and drives said image sensor in a second power save mode in a case that the vertical transfer period is not less than twice the horizontal transfer period.

2. The apparatus according to claim 1, wherein said image sensor includes an amplifier connected to each of the column output lines, and said control unit controls said driving unit in the first power save mode so as to execute a plurality of vertical transfers during a horizontal transfer period for one row and execute, in each vertical transfer period, first signal transfer of transferring pixel signals to the holding units via an amplifier corresponding to a column output line to which pixels which transfer the pixel signals are connected, and second signal transfer of transferring pixel signals to the holding units via an amplifier which does not correspond to the column output line to which the pixels which transfer the pixel signals are connected, without supplying power to amplifiers which are not used in the vertical transfer period.

3. The apparatus according to claim 1, wherein said image sensor includes a plurality of row transfer lines and an amplifier arranged for each of the row transfer lines, and said control unit controls said driving unit in the second power save mode so as to execute a plurality of horizontal transfers during a vertical transfer period for one row and execute horizontal transfer of one row separately in the plurality of horizontal transfers via specific amplifiers, without supplying power to amplifiers which are not used in the horizontal transfer.

4. The apparatus according to claim 1, wherein said image sensor includes two column output lines for each of a plurality of pixel columns, and an amplifier connected to each of the column output lines, and said control unit controls said driving unit in the first power save mode so as to execute a plurality of vertical transfers during a horizontal transfer period for two rows and execute, in each vertical transfer period, first signal transfer of transferring pixel signals to the holding unit via an amplifier corresponding to a column output line to which pixels which transfer the pixel signals are connected, and second signal transfer of transferring pixel signals to the holding unit via an amplifier which does not correspond to the column output line to which the pixels which transfer the pixel signals are connected, without supplying power to amplifiers which are not used in the vertical transfer period.

5. The apparatus according to claim 1, wherein said image sensor includes a plurality of row transfer lines and an amplifier arranged for each of the row transfer lines, and said control unit controls said driving unit in the second power save mode so as to execute a plurality of horizontal transfers during a vertical transfer period for two rows and execute horizontal transfer of two rows separately in the plurality of horizontal transfers via specific amplifiers, without supplying power to an amplifiers which are not used in the horizontal transfer.

6. The apparatus according to claim 1, wherein said image sensor includes, an amplifier connected to each of the column output lines, and said control unit controls said driving unit in the first power save mode so as to execute, during a horizontal transfer period for a plurality of rows, a plurality of vertical transfers equal in number to rows transferred during the horizontal transfer period and execute, in each vertical transfer period, first signal transfer of transferring pixel signals to the holding units via an amplifier corresponding to a column output line to which pixels which transfer the pixel signals are connected, and second signal transfer of transferring pixel signals to the holding units via an amplifier which does not correspond to the column output line to which the pixels which transfer the pixel signals are connected, without supplying power to amplifiers which are not used in the vertical transfer period.

7. The apparatus according to claim 1, wherein said image sensor includes a plurality of horizontal transfer lines and an amplifier connected to each of the row transfer lines, and said control unit controls said driving unit in the second power save mode so as to execute, during a vertical transfer period for a plurality of columns, a plurality of horizontal transfers equal in number to columns transferred during the vertical transfer period, and execute horizontal transfer corresponding to rows equal in number to the columns vertically transferred separately in the plurality of horizontal transfers via specific amplifiers, without supplying power to amplifiers which are not used in the horizontal transfer.

8. The apparatus according to claim 3, wherein no power is supplied to corresponding circuits located in subsequent stages of amplifiers to which no power is supplied in the second power save mode.

9. The apparatus according to claim 5, wherein no power is supplied to corresponding circuits located in subsequent stages of amplifiers to which no power is supplied in the second power save mode.

10. The apparatus according to claim 7, wherein no power is supplied to corresponding circuits located in subsequent stages of amplifiers to which no power is supplied in the second power save mode.

* * * * *